(12) United States Patent
Nussbaumer et al.

(10) Patent No.: US 11,070,108 B2
(45) Date of Patent: Jul. 20, 2021

(54) ELECTROMAGNETIC ROTARY DRIVE AND A ROTATIONAL DEVICE

(71) Applicant: Levitronix GmbH, Zürich (CH)

(72) Inventors: Thomas Nussbaumer, Zürich (CH); Thomas Holenstein, Umiken (CH)

(73) Assignee: LEVITRONIX GMBH, Zürich (CH)

( * ) Notice: Subject to any disclaimer, the term of this patent is extended or adjusted under 35 U.S.C. 154(b) by 0 days.

(21) Appl. No.: 16/455,175

(22) Filed: Jun. 27, 2019

(65) Prior Publication Data
US 2020/0021166 A1    Jan. 16, 2020

(30) Foreign Application Priority Data

Jul. 12, 2018 (EP) .................................... 18183186

(51) Int. Cl.
*H02K 7/09*     (2006.01)
*F16C 32/04*    (2006.01)
*H02K 21/14*    (2006.01)

(52) U.S. Cl.
CPC ........... *H02K 7/09* (2013.01); *F16C 32/0497* (2013.01); *H02K 21/14* (2013.01); *H02K 2201/15* (2013.01)

(58) Field of Classification Search
CPC ...... H02K 7/09; H02K 21/14; H02K 2201/15; H02K 1/2786; H02K 1/28; H02K 7/14; F16C 32/0497; F16C 32/048; B01F 13/0872; H02N 15/00

(Continued)

(56) References Cited

U.S. PATENT DOCUMENTS

| 5,587,617 A | 12/1996 | Dunfield et al. |
| 5,652,473 A * | 7/1997 | Delamare ............. F04D 19/048 |
|  |  | 310/156.26 |

(Continued)

FOREIGN PATENT DOCUMENTS

| EP | 0819330 B1 | 6/2001 |
| EP | 0860046 B1 | 2/2003 |
| EP | 2065085 B | 11/2012 |

OTHER PUBLICATIONS

Extended European Search Report dated Dec. 10, 2018 in corresponding European Patent Application No. 18183186.8, filed Jul. 12, 2018.

(Continued)

*Primary Examiner* — John K Kim
(74) *Attorney, Agent, or Firm* — Global IP Counselors, LLP

(57) ABSTRACT

An electromagnetic rotary drive includes a ring-shaped magnetically effective core arranged around a stator and has a magnetic central plane. The stator is a bearing and a drive stator, with which, the rotor is contactlessly magnetically drivable about an axis of rotation, and with which the rotor is contactlessly magnetically levitatable with respect to the stator. The rotor actively magnetically levitated in a radial plane perpendicular to an axial direction, and passively magnetically stabilized in the axial direction and against tilting. The rotor includes a magnetically effective bearing ring arranged radially externally disposed and spaced from the magnetically effective core, and a bearing stator having a magnetically effective stator ring interacts with the bearing ring. The bearing stator is configured such that the stator ring passively magnetically stabilizes the rotor against tilting, and the bearing ring is connected to the magnetically effective core of the rotor via a connecting element.

19 Claims, 14 Drawing Sheets

(58) Field of Classification Search
 USPC .......................................................... 310/90.5
 See application file for complete search history.

(56) References Cited

U.S. PATENT DOCUMENTS

| | | | | |
|---|---|---|---|---|
| 5,686,772 | A * | 11/1997 | Delamare | F04D 19/048 310/90.5 |
| 6,794,777 | B1 * | 9/2004 | Fradella | F16C 32/0457 310/68 B |
| 10,873,241 | B2 * | 12/2020 | Schob | F04D 13/0673 |
| 10,947,986 | B2 * | 3/2021 | Chen | F04D 13/0653 |
| 2003/0193252 | A1 * | 10/2003 | Locke | F16C 32/0444 310/90.5 |
| 2007/0080595 | A1 | 4/2007 | Akiyama et al. | |
| 2010/0282528 | A1 * | 11/2010 | Palti | B60K 8/00 180/65.1 |
| 2020/0021166 | A1 * | 1/2020 | Nussbaumer | F16C 32/048 |

OTHER PUBLICATIONS

Yonnet, J.P., "Permanent magnet bearings and couplings", IEEE Transaction on Magnetics, Bd. 17, Nr. 1, Jan. 1, 1981, XP055527088, p. 1169-1173.

* cited by examiner

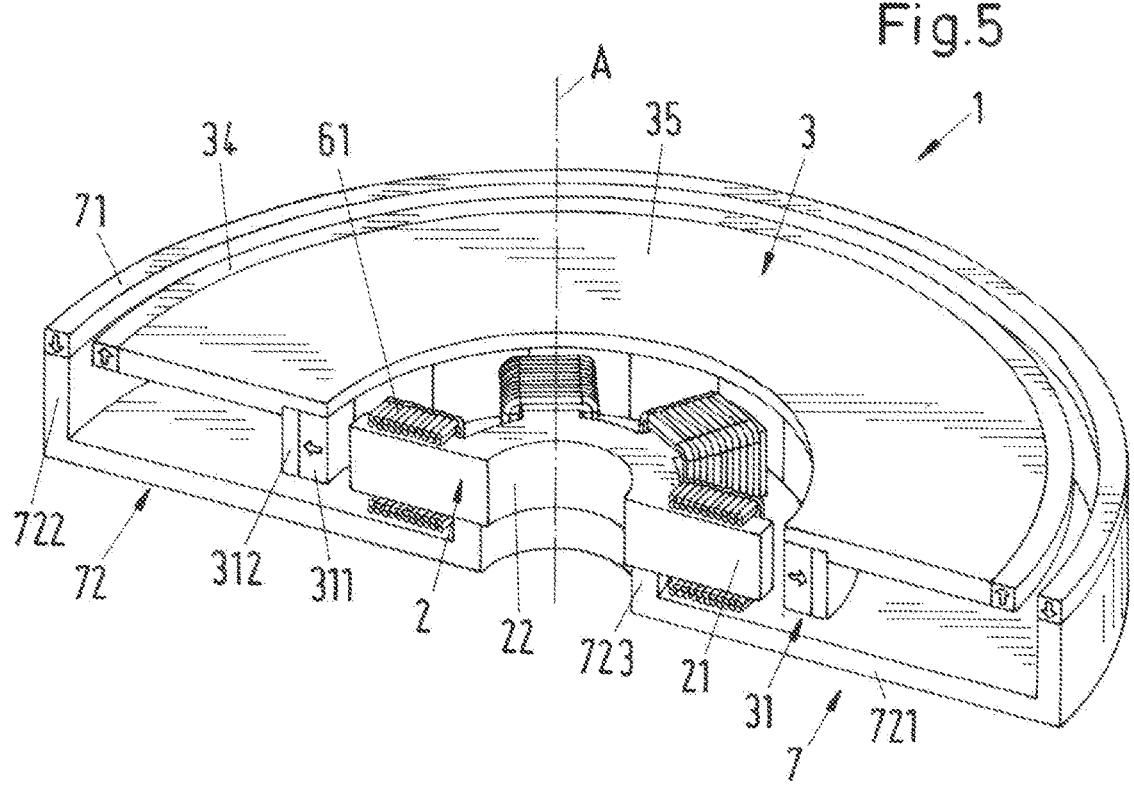
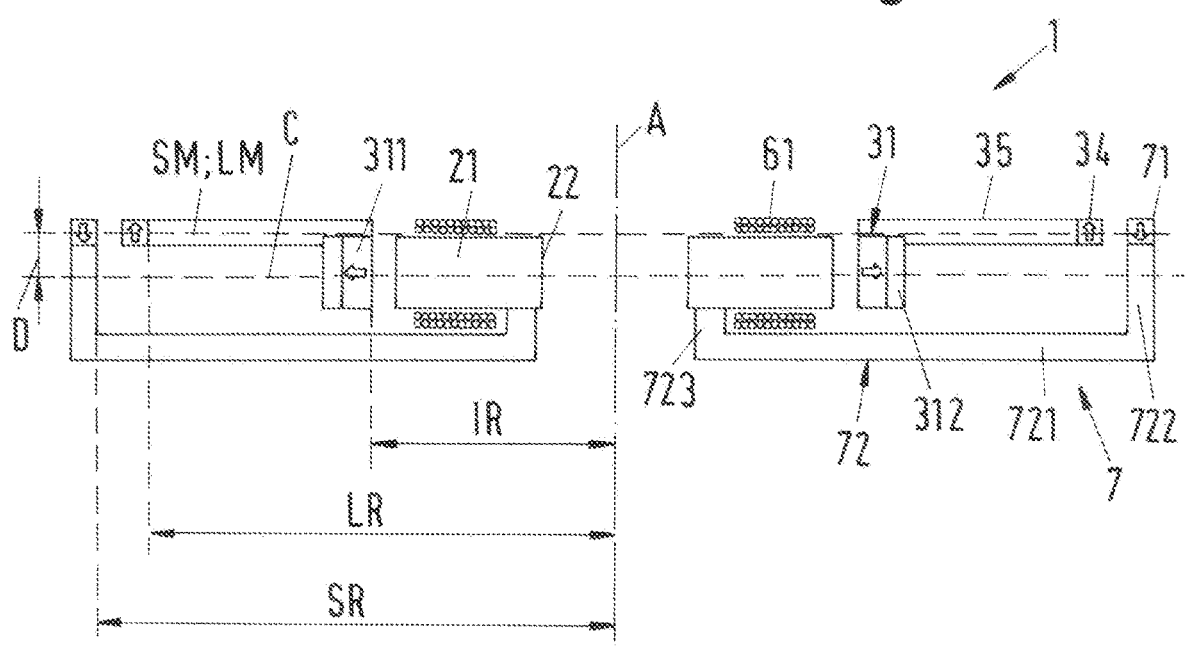

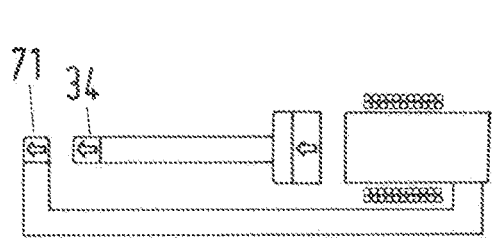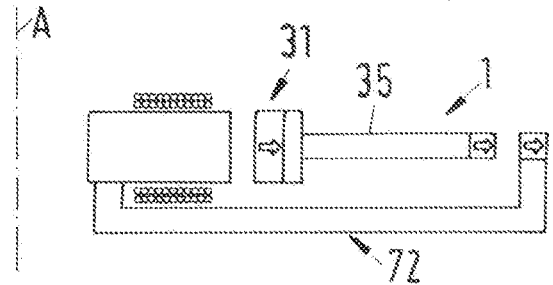
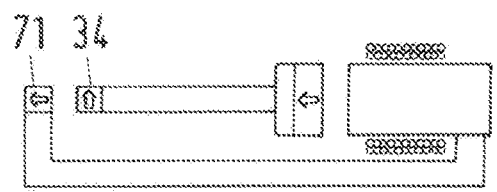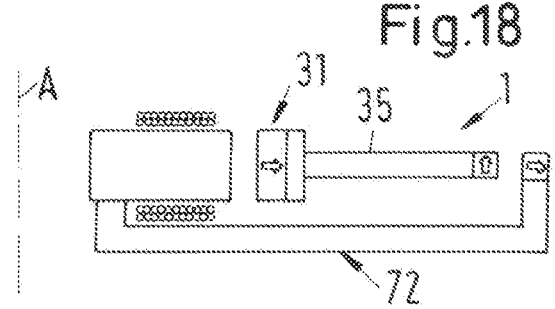
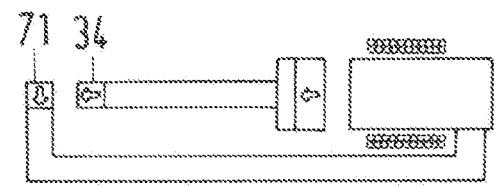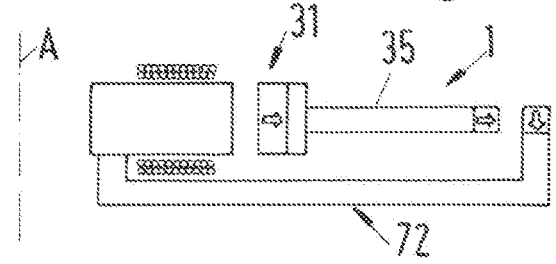
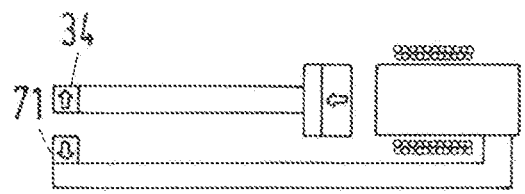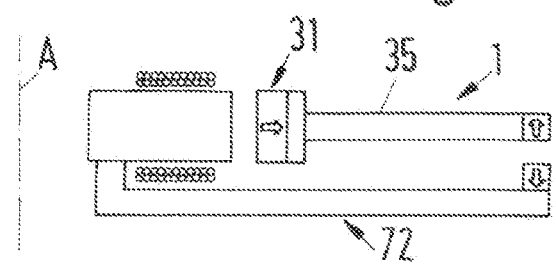
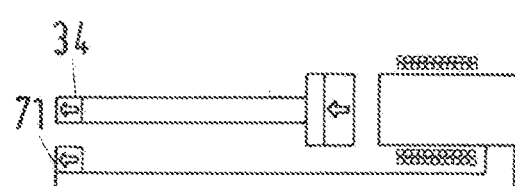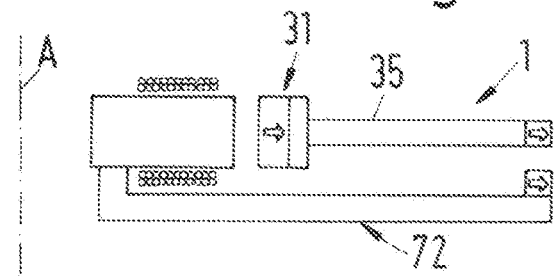

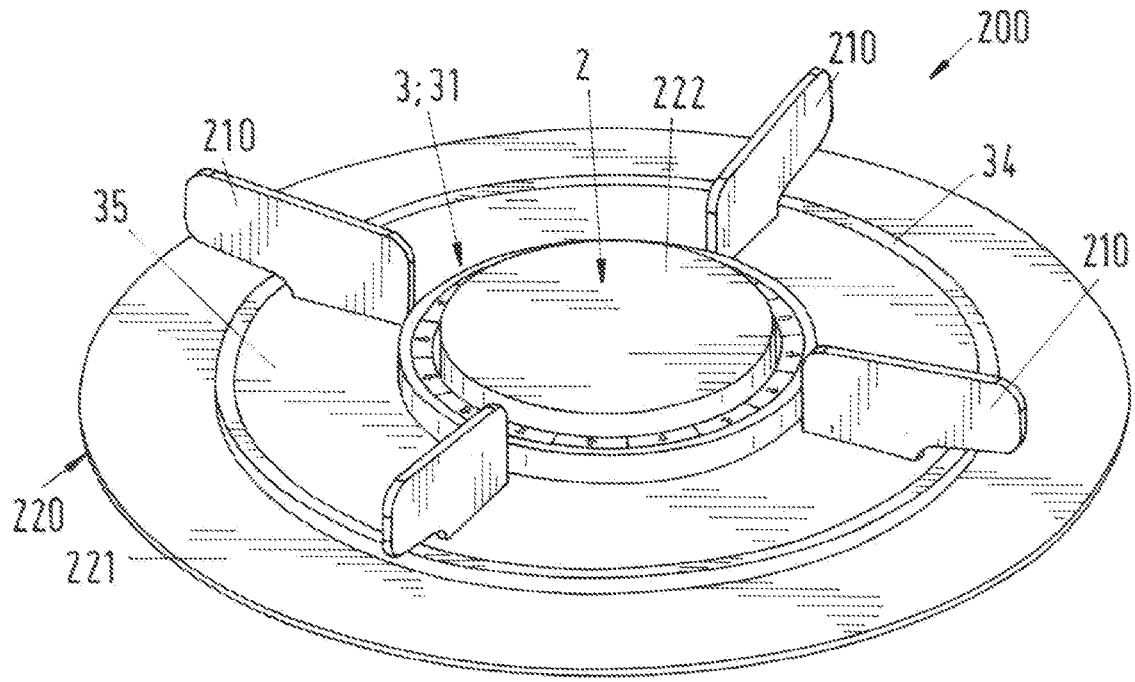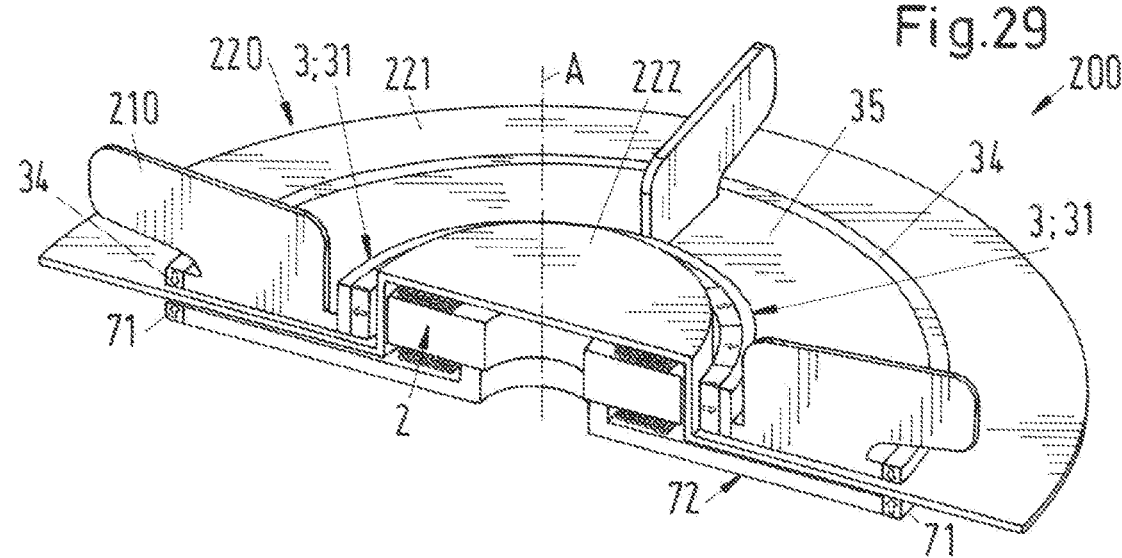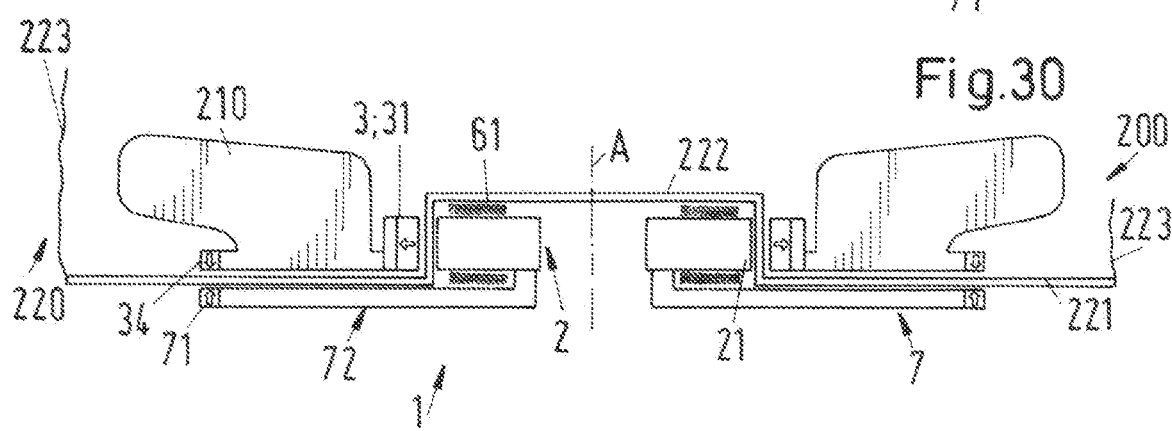

ELECTROMAGNETIC ROTARY DRIVE AND A ROTATIONAL DEVICE

CROSS-REFERENCE TO RELATED APPLICATION

This application claims priority to European Application No. 18183186.8, filed Jul. 12, 2018, the contents of which are hereby incorporated herein by reference.

BACKGROUND

Field of the Invention

The invention relates to an electromagnetic rotary drive and to a rotational device.

BACKGROUND OF THE INVENTION

Conventional electromagnetic rotary drives are generally designed and operated according to the principle of a bearingless motor. The term bearingless motor in this respect means an electromagnetic rotary drive in which the rotor is levitated completely magnetically with respect to the stator, with no separate magnetic bearings provided. For this purpose, the stator is designed as a bearing and drive stator, which is therefore both the stator of the electric drive and the stator of the magnetic levitation. By using the electrical windings of the stator, a rotating magnetic field can be generated which, on the one hand, exerts a torque onto the rotor which effects its rotation and which, on the other hand, exerts a shear force, which can be set as desired, onto the rotor, so that its radial position can be controlled or regulated actively. At least three degrees of freedom of the rotor can thus be actively regulated, namely its rotation and its radial position (two degrees of freedom). With respect to three further degrees of freedom, namely its position in axial direction and tilts with respect to the radial plane perpendicular to the desired axis of rotation (two degrees of freedom), the rotor is passively magnetically levitated or stabilized by reluctance forces, i.e. it cannot be controlled. The absence of a separate magnetic beating with a complete magnetic levitation of the rotor is the property, which gives the bearingless motor its name.

The bearingless motor has become sufficiently well-known to the person skilled in the art in the meantime and is used for a number of different applications. Some fundamental descriptions can be found, for example, in EP A 0 860 046 and in EP-A-0 819 330.

In FIG. 1, a possible design of a bearingless motor can be seen with exemplary nature in a perspective representation, which is known from the state of the art. For a better understanding, FIG. 2 still shows a perspective sectional representation of the bearingless motor from FIG. 1, wherein the section is made in axial direction A'. in order to indicate that the representation in FIG. 1 and FIG. 2 is a device according to the state of the art, the reference signs here are each marked with an inverted comma or a dash. The bearingless motor is referred to as a whole with the reference sign 1' and is designed here as an external rotor. This means that the stator 2' is arranged radially internally disposed and is surrounded by the rotor 3'.

The stator 2' comprises a plurality—here six—of pronounced stator poles 21', each extending radially outwards from a ring-shaped reflux 22'. In this respect, a radial direction means a direction which stands perpendicular on the axial direction A', which is defined by the desired axis of rotation of the rotor 3', i.e. the axis of rotation about which the rotor 3' rotates in the operating state when it is in a centered and not tilted position with respect to the stator 2'. The reflux 22' and the stator poles 21' are made of a ferromagnetic material, for example of iron.

In FIG. 1 and FIG. 2 only the magnetically effective core 31' of the rotor 3' is shown, which is designed annularly and permanently magnetic. For this purpose, the magnetically effective core 31' comprises a plurality of permanent magnets 311', which are each designed as a ring segment, wherein the totality of the permanent magnets 311' complement each other to form a ring. Each permanent magnet 311' is magnetized in radial direction, wherein adjacent permanent magnets 311' are magnetized in the opposite direction in each case, so that, seen in the circumferential direction, the permanent magnets 311' are alternately magnetized radially inwards and radially outwards. The magnetization of the individual permanent magnets 311' is indicated by the arrow without reference sign in the permanent magnets 311' in each case.

The magnetically effective core 31' further has a reflux ring 312' made of a ferromagnetic material such as iron, which surrounds the permanent magnets 311' and which serves to guide the magnetic flux.

In order to generate the electromagnetic rotating fields necessary for the magnetic drive and magnetic levitation of the rotor 3', the stator poles 21' carry windings. With the design shown in FIG. 1 and FIG. 2, the windings are designed, for example, such that a discrete coil 61' is wound around each stator pole 21'. In the operating state, with these coils 61' those electromagnetic rotating fields are generated, with which a torque on the rotor 3' is caused, and with which an arbitrarily settable shear force in radial direction can be exerted on the rotor 3', so that the radial position of the rotor 3', i.e. its position in the radial plane perpendicular to the axial direction A', can be actively controlled or regulated.

With respect to three further degrees of freedom, namely the position of the rotor 3' in axial direction A' and tilts (two degrees of freedom), the rotor 3' is passively magnetically levitated or stabilized by reluctance forces, i.e. it cannot be controlled.

With regard to the passive magnetic levitation of the rotor 3', it is preferred that the inner diameter of the magnetically effective core 31' of the rotor 3' is dimensioned such that it is at least 2.6 times as large as the height h' of the magnetically effective core 31' in axial direction In FIG. 2, R' designates the inner radius of the ring-shaped magnetically effective core 31' of the rotor 3'. The condition $2*R' \geq 2.6*h'$ should therefore be fulfilled, i.e. the inner diameter of the magnetically effective core 31' should be larger than or at least as large as 2.6 times its height h' in axial direction A'.

Electromagnetic rotary drives, which are designed according to the principle of the bearingless motor, have been proven in a variety of applications.

Due to the absence of mechanical bearings, the bearingless motor 1' is in particular suitable for pumping, mixing and stirring devices with which very sensitive substances are conveyed, for example blood pumps, or on which very high demands are made on purity, for example in the pharmaceutical industry or in the biotechnological industry, or with which abrasive or aggressive substances are conveyed which would very quickly destroy mechanical bearings, for example pumps or mixers for slurry in the semiconductor industry. Bearingless motors are also used in semiconductor production for levitating and rotating wafers, for example when they are coated or treated with photoresist or other substances.

A further advantage of the principle of the bearingless motor results from the design of the rotor as an integral rotor, which is both the rotor of the electromagnetic drive and the rotor of the pump or the stirrer or the mixer or the holder for rotating a wafer. In addition to the contactless magnetic levitation, the advantage results here of a very compact and space-saving configuration.

In addition, the principle of the bearingless motor also allows designs in which the rotor 3' can be very easily separated from the stator 2'. This is a very big advantage since the rotor 3' can be designed as a single-use part for single use, for example. Such single-use applications today frequently replace processes in which all those components which come into contact with the substances to be treated in the process once had to be cleaned and sterilized in a complex manner, for example by steam sterilization, due to the very high purity demands. In the design for single use, those components which come into contact with the substances to be treated are only used exactly once and are then replaced with new, that is unused, single-use parts in the next application.

The pharmaceutical industry and the biotechnological industry can be named as examples here. Solutions and suspensions are frequently produced here, which require a careful blending or conveying of the substances.

In the pharmaceutical industry, for example in the production of pharmaceutically active substances, very high demands are made on cleanliness, the components which come into contact with the substances often even have to be sterile. Similar demands also result in biotechnology, for example in the production, treatment or cultivation of biological substances, cells or microorganisms, where an extremely high degree of cleanliness has to be ensured in order not to endanger the usability of the product produced. Bioreactors can be named as a further example here in which, for example, biological substitutes for tissue or special cells or other very sensitive substances are cultivated. Pumping, stirring or mixing devices are also required here in order, for example, to ensure a continuous blending of the nutrient fluid or to ensure its continuous circulation in the mixing tank. A very high purity has to be ensured in this respect to protect substances or the produced products from contamination.

In such applications, the pumping, stirring or mixing device is then composed of a single-use device and a reusable device. In this respect, the single-use device comprises those components which come into contact with the substances and which are designed as single-use parts for single use. This is, for example, the pumping or mixing tank with the rotor 3', which is provided therein and which then, for example, comprises an impeller for conveying the substances. The reusable device comprises those components which are used permanently, that is multiple times, for example the stator 2'. Such a device is disclosed, for example, in EP-B-2 065 085.

SUMMARY

In all these applications in which the bearingless motor is successfully used, it is in principle possible to design the bearingless motor as an internal rotor, i.e. with an internally disposed rotor and a stator arranged around it, or as an external rotor (see FIG. 1), i.e. with an internally disposed stator 2' and a rotor 3' arranged around it. However, it has been shown in particular in designs as external rotor that for some applications the passive magnetic stabilization of the rotor 3', especially that against tilting, reaches its limits or even is no longer sufficient to ensure safe and trouble-free operation of the rotary drive. Compared to the internal rotor, the maximum tilt stabilizing torque that can be achieved with the external rotor is drastically lower. This significantly reduced passive magnetic stabilization against tilting when designed as an external rotor is insufficient in practice for some applications.

Starting from this state of the art, it is therefore an object of the invention to propose an electromagnetic rotary drive, which is configured as an external rotor, and which comprises a rotor that can be contactlessly magnetically driven and contactlessly magnetically levitated, wherein the passive magnetic stabilization of the rotor is significantly improved in particular against tilting. In addition, it is an object of the invention to propose a rotational device comprising such a rotary drive.

The subject of the invention meeting this object is characterized by the features of the embodiments of the invention disclosed herein.

According to the aspects of the present invention, an electromagnetic rotary drive is thus proposed, which is configured as an external rotor having a rotor comprising a ring-shaped magnetically effective core being arranged around a stator and having a magnetic central plane, wherein the stator is designed as a bearing and drive stator with which, in the operating state, the rotor is contactlessly magnetically drivable about a desired axis of rotation defining an axial direction, and with which the rotor is contactlessly magnetically levitatable with respect to the stator, wherein the rotor is actively magnetically levitated in a radial plane perpendicular to the axial direction, and is passively magnetically stabilized in axial direction and against tilting, wherein the rotor comprises a magnetically effective bearing ring, which is arranged radially externally disposed and spaced from the magnetically effective core of the rotor, and wherein an additional bearing stator having a magnetically effective stator ring is provided for interaction with the bearing ring, wherein the additional bearing stator is designed and arranged in such a way that the stator ring passively magnetically stabilizes the rotor against tilting, and wherein the bearing ring is connected to the magnetically effective core of the rotor via a connecting element made of a low-permeable material.

Due to the interaction of the additional bearing stator, more precisely the magnetically effective stator ring of the additional bearing stator, with the magnetically effective bearing ring of the rotor, a significantly improved stabilization of the rotor against tilting with respect to the radial plane can be achieved in particular, wherein the radial plane is that plane in which the radial position of the rotor is actively magnetically regulated. The additional bearing stator and the bearing ring of the rotor function in principle like an additional passive magnetic axial bearing of the rotor, which in particular significantly increases the tilting rigidity of the rotor. The maximum torque that causes tilts of the rotor, which can be compensated with the design according to the invention, is considerably larger than with known electromagnetic rotary drives which are designed as external rotors with a magnetically levitated, disk-shaped or ring-shaped magnetically effective rotor core, for example by at least a factor of 20. Due to this fact, the rotary drive according to the invention can be used for applications for which known designs are not suitable or not suitable at all, because the passive forces to stabilize the rotor against tilting are not sufficiently high in these known designs.

The rotary drive according to the invention combines in an advantageous way the well-known advantages of the principle of the bearingless motor with an additional passive magnetic axial bearing or axial stabilization of the rotor. For this purpose, the rotor of the rotary drive according to the invention has two different magnetically effective regions, which are magnetically decoupled from one another at least substantially by the connecting element made of a low-permeable material. The ring-shaped magnetically effective core of the rotor interacts in a known manner according to the principle of the bearingless motor with the stator designed as a bearing and drive stator. The magnetically effective bearing ring of the rotor, which is arranged radially externally disposed with respect to the magnetically effective core, interacts with the magnetically effective stator ring of the additional bearing stator, which results in an additional passive magnetic axial bearing of the rotor, which in particular significantly increases the tilting rigidity of the rotor.

With respect to the design of the additional passive magnetic axial bearing, several basic variants are possible.

For example, it is possible to design the magnetically effective bearing ring with permanent magnetism and the stator ring of the additional bearing stator with ferromagnetic magnetism. In this respect, the bearing ring can be formed entirely of a permanent magnetic material, i.e. for example being designed as a permanent magnetic ring, in one piece or composed of several permanent magnetic segments or comprising one or a plurality of permanent magnets which are connected to each other by ferromagnetic intermediate pieces. The stator ring can be designed as a ferromagnetic ring, for example as a one-piece or segmented ring, and in particular as an iron ring.

Another variant is to design the magnetically effective stator ring of the additional bearing stator in a permanent magnetic manner and to design the bearing ring of the rotor in a ferromagnetic manner. The stator ring can be formed entirely of a permanent magnetic material, i.e. for example being designed as a permanent magnetic ring, in one piece or composed of several permanent magnetic segments or comprising one or a plurality of permanent magnets which are connected to each other by ferromagnetic intermediate pieces. The bearing ring can be designed as a ferromagnetic ring, for example as a one-piece or segmented ring, and in particular as an iron ring.

Another preferred variant is that both the bearing ring of the rotor and the stator ring of the additional bearing stator each comprise at least one permanent magnet, i.e. each being designed in a permanent magnetic manner. The stator ring and the bearing ring can each be made entirely of a permanent magnetic material, i.e. they can, for example, each be designed as a permanent magnetic ring, in one piece or composed of several permanent magnetic segments, or each comprise one or a plurality of permanent magnets which are connected to each other, for example, by ferromagnetic intermediate pieces.

According to a preferred embodiment, the bearing ring of the rotor is arranged in the magnetic central plane of the magnetically effective core of the rotor. This means that the bearing ring of the rotor and the ring-shaped magnetically effective core of the rotor are arranged as concentric rings in the same plane, so that the bearing ring surrounds the magnetically effective core centrally with respect to the axial direction.

In another, also preferred embodiment, the bearing ring is arranged with respect to the axial direction at a distance different from zero to the magnetic central plane of the magnetically effective core of the rotor, wherein the distance is at most one quarter, preferably at most one fifth, of the inner radius of the bearing ring. In this embodiment, the ring-shaped magnetically effective core of the rotor and the bearing ring of the rotor are arranged parallel to each other and each centered with respect to the axial direction, so that their centers lie on the same axis, the magnetic core and the bearing ring being spaced apart with respect to the axial direction. The bearing ring can be arranged above or below the magnetic central plane of the magnetically effective core—with respect to the normal position of use. Preferably, the distance of the bearing ring from the magnetic central plane is at most one quarter and particularly preferred at most one fifth of the inner radius of the bearing ring, so that the destabilizing effect of the additional axial bearing does not exceed the additional stabilization against tilting. The distance of the bearing ring from the magnetic central plane refers to the distance between the central plane of the bearing ring and the magnetic central plane in axial direction.

There are several variants with respect to the arrangement of the stator ring. According to a preferred variant, the stator ring of the additional bearing stator is arranged concentrically with the bearing ring of the rotor in such a way that the stator ring surrounds the bearing ring radially externally disposed. This means that the bearing ring of the rotor and the stator ring of the additional bearing stator are arranged as concentric rings in the same plane so that the stator ring surrounds the bearing ring centrally with respect to the axial direction.

According to another, also preferred variant, the stator ring of the additional bearing stator is arranged spaced from the bearing ring of the rotor with respect to the axial direction, wherein the stator ring preferably has the same inner radius as the bearing ring. In this variant, the stator ring of the additional bearing stator and the bearing ring of the rotor are arranged parallel to each other and each centered with respect to the axial direction, so that their centers lie on the same axis, the stator ring and the bearing ring being spaced apart with respect to the axial direction. In this respect, the stator ring can be arranged above or below the bearing ring—with respect to the normal position of use, the bearing ring and the stator ring being particularly preferably arranged in alignment with one another with respect to the axial direction.

Several variants are possible with respect to the design of the connecting element, which connects the magnetically effective core of the rotor with the bearing ring of the rotor. For example, the connecting element can be designed as a complete ring disk, which is arranged between ring-shaped magnetically effective core of the rotor and the bearing ring of the rotor with respect to the radial direction. Preferably, the connecting element is designed in a disk-shaped manner and optionally has a plurality of recesses to reduce the material requirement for the connecting element and its weight.

According to another, also preferred embodiment, the connecting element comprises a plurality of spokes, each of them extending in radial direction between the magnetically effective core of the rotor and the magnetically effective bearing ring of the rotor.

With regard to an additional stabilization as strong as possible and with regard to a simple production, it is preferred that the stator ring and the bearing ring each include a permanent magnetic material and are each designed segmented with a plurality of permanent magnets. In this preferred embodiment, both the stator ring and the bearing ring are made entirely of a permanent magnetic material. For manufacturing reasons, it is preferred that both the bearing ring and the stator ring are designed segmented, i.e. both the stator ring and the bearing ring each comprise a plurality of permanent magnets, each of which is designed as a ring segment, the totality of the permanent magnets complementing each other to form a ring.

There are several variants with respect to the magnetization of the stator ring and the bearing ring.

According to a first preferred variant, the stator ring and the bearing ring each are magnetized in axial direction, the magnetization of the stator ring being directed in the opposite direction to the magnetization of the bearing ring.

According to another, also preferred embodiment, the stator ring and the bearing ring each are magnetized in the radial direction, the magnetization of the stator ring and the magnetization of the bearing ring being directed in the same direction, and preferably the magnetization of the stator ring and the magnetization of the bearing ring each being directed radially outwards.

Another preferred embodiment is that either the stator ring is magnetized in axial direction and the hearing ring is magnetized in radial direction, or the stator ring is magnetized in the radial direction and the bearing ring is magnetized in the axial direction.

A rotational device for treating a surface of a disk-shaped body is further proposed by the invention, with which rotational device the body is rotatable for treatment, which rotational device comprises an electromagnetic rotary drive being designed according to the invention, wherein the rotor comprises a holder for the disk-shaped body. The body can be held on the rotor by the holder, or the body can be fixed on the rotor by the holder. Such a rotational device can be used, for example, in the semiconductor industry to apply surfaces of substrates, e.g. the surface of wafers for the production of electronic components, with fluids, e.g. suspensions, in a controlled manner in order to process their surfaces. As examples, chemical-mechanical polishing processes (CMP) by slurry, cleaning and/or etching of wafers, application of photoresist or removal of photoresist with solvents are mentioned here. In addition to these wet processes, in which the wafers are applied with a fluid, the rotational device is also suitable for dry processes, especially in the semiconductor industry. Examples of such dry processes in which the wafers or other components or substrates are rotated are: plasma etching, rapid thermal processing (RTP), atomic layer deposition (ALD), chemical vapor deposition (CVD), or physical vapor deposition (PVD).

In such wet processes or dry processes, the wafers in the form of thin disks are typically set into rapid rotation in a process chamber and then applied with the respective fluid (wet processes) for treating or applied with the radiation or the substances to be separated (dry processes). For this purpose, the wafer to be treated can be attached on the rotor of the rotational device according to the invention by the holder and can then be rotated.

Furthermore, a rotational device for conveying, mixing or stirring fluids is proposed by the invention, wherein the rotational device comprises an electromagnetic rotary drive, which is designed according to embodiments of the invention, and wherein the rotor of the rotary drive is designed as rotor of the rotational device. This design, also referred to as integral rotor enables a particularly compact design of the rotational machine, because the rotor of the electromagnetic rotary drive is also the rotor of the rotational machine with which a force is exerted on the fluid to be conveyed or stirred.

According to an embodiment, the rotor has a plurality of vanes for mixing or stirring fluids, the vanes being arranged on the connecting element.

In particular, the rotational device according to the invention may also be designed such that it comprises components for single use. In such a design, the rotational device preferably has a single-use device designed for single use and a reusable device designed for multiple use, wherein the single-use device comprises at least the rotor optionally having a plurality of vanes for conveying, pumping, mixing or stirring fluids, and wherein the reusable device comprises at least the stator and the additional bearing stator, with which the rotor is drivable and levitatable magnetically contactlessly in the operating state. If the rotational device is designed as a mixing or stirring device, the components for single use preferably also comprise the flexible mixing tank, for example, in which the rotor is arranged.

Further advantageous measures and embodiments of the invention result from the embodiments described herein.

BRIEF DESCRIPTION OF THE DRAWINGS

The invention will be explained in more detail hereinafter with reference to the drawings.

FIG. 5 is a variant of the first embodiment in a perspective sectional representation, FIG. 6 is a schematic section in the axial direction through the variant from FIG. 5, FIG. 17-21 are different variants for the magnetization of the bearing ring and the stator ring, each in a schematic sectional representation, FIG. 28 is a perspective representation of an embodiment of a rotational device according to the invention for conveying, mixing or stirring fluids, FIG. 29 is a perspective sectional representation of the embodiment from FIG. 28, and FIG. 30 is a schematic section in axial direction through the embodiment from FIG. 28.

DETAILED DESCRIPTION OF THE EMBODIMENTS

Figure 1:
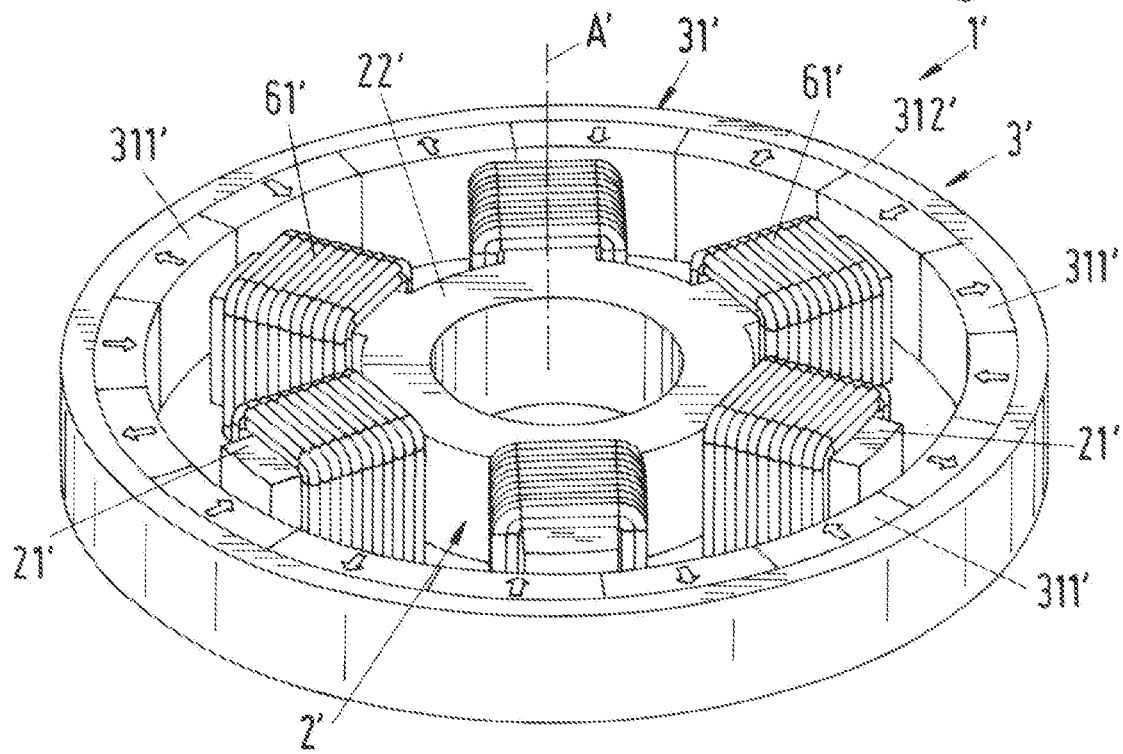
FIG. 1 is a perspective representation of an electromagnetic rotary drive designed as a bearingless motor according to the state of the art.
Figure 2:
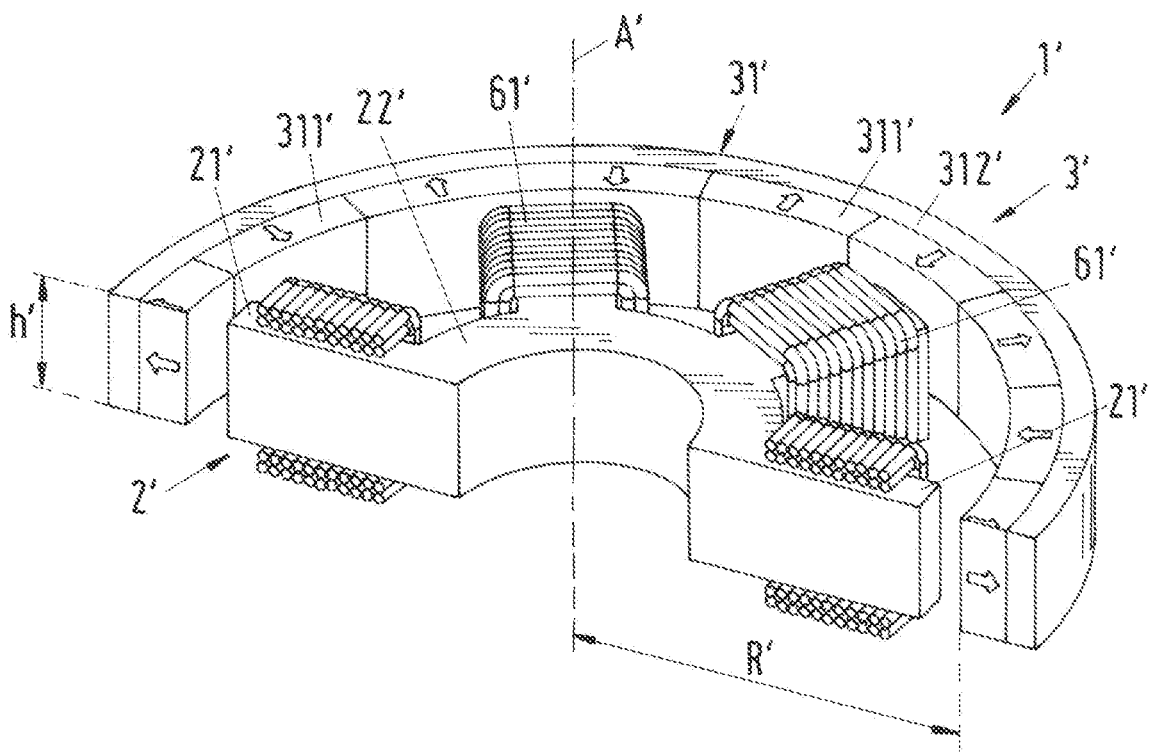
FIG. 2 is a perspective sectional representation of the drive from FIG. 1.

As already mentioned and explained, an electromagnetic rotary drive is represented in FIG. 1 and FIG. 2, which is known from the state of the art and which is designed as a bearingless motor.

Figure 3:
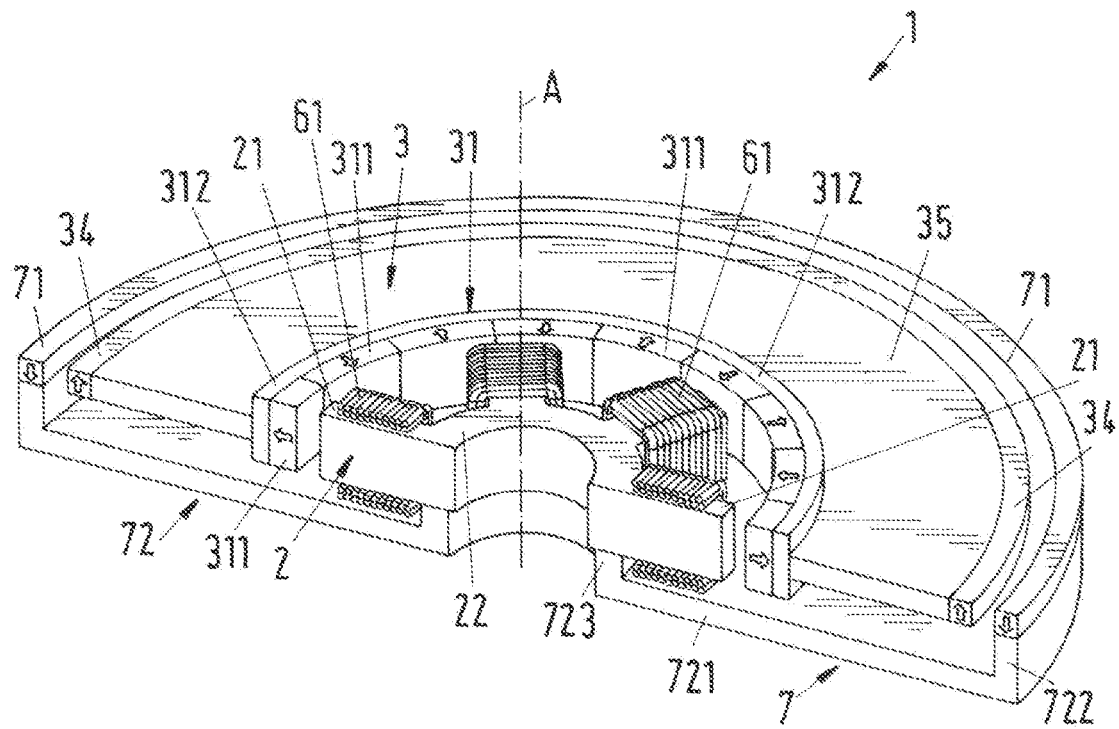
FIG. 3 is a perspective sectional representation of a first embodiment of an electromagnetic rotary drive according to the present invention.

FIG. 3 shows a perspective sectional representation of a first embodiment of an electromagnetic rotary drive according to the present invention, which is designated as a whole by the reference sign 1. For a better understanding, FIG. 4 still shows a schematic section in axial direction through this first embodiment. The rotary drive 1 is designed as an external rotor and comprises a stator 2 and a rotor 3 contactlessly magnetically levitated with respect to the stator 2. Furthermore, the rotor 3 is contactlessly magnetically drivable for rotation about a desired axis of rotation by the stator 2. The desired axis of rotation refers to that axis about which the rotor 3 rotates in the operating state when the rotor 3 is in a centered and not tilted position with respect to the stator 2. This desired axis of rotation defines an axial direction A. Usually, the desired axis of rotation defining the axial direction A corresponds to the central axis of the stator 2.

In the following, a radial direction refers to a direction, which stands perpendicular on the axial direction A.

The stator 2 comprises a plurality—here six—of pronounced stator poles 21, each extending outwards in radial direction from a radially internally disposed ring-shaped reflux 22. The stator poles 21 carry windings to generate the electromagnetic rotating fields required for the magnetic drive and for the magnetic levitation of the rotor 3. In the embodiment shown in FIG. 3 and FIG. 4, the windings are designed, for example, such that a discrete coil 61 is wound around each stator pole 21. With these coils 6, those electromagnetic rotating fields are generated in the operating state with which a torque is exerted on the rotor 3, and with which a shear force, which can be set as desired, can be exerted in radial direction on the rotor 3, so that the radial position of the rotor 3, i.e. its position in the radial plane perpendicular to the axial direction A, can be actively controlled or regulated.

The rotor 3 comprises a magnetically effective core 31, which is designed in the form of a ring disk or a circular cylindrical ring with the height HR in axial direction A and with the inner radius IR. As is usual with an external rotor, the rotor 3 or its magnetically effective core 31 is arranged around the stator 2, so that the stator 2 is arranged radially internally disposed with respect to the magnetically effective core 31 of the rotor 3 and the stator poles 21 are opposite the magnetically effective core 31 surrounding them. The "magnetically effective core 31" of the rotor 3 refers to that region of the rotor 3 which magnetically interacts with the stator poles 21 for torque generation and the generation of magnetic bearing forces.

Figure 4:
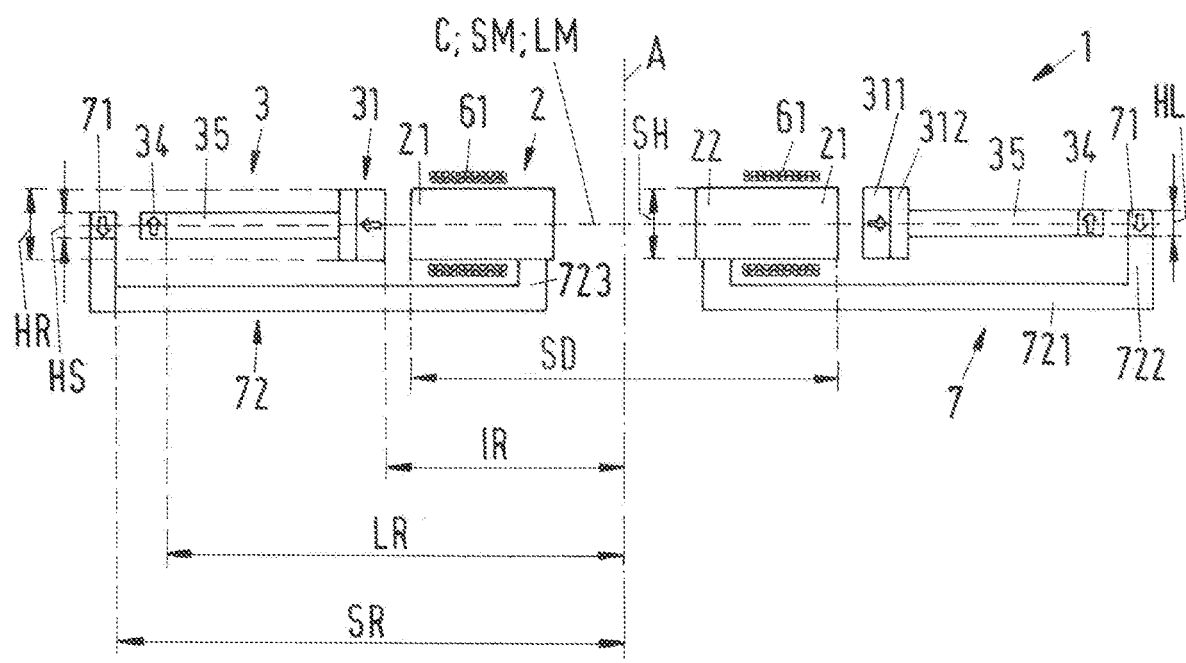
FIG. 4 is a schematic section in the axial direction through the first embodiment from FIG. 3.

In the first embodiments represented in FIG. 3 and FIG. 4, the magnetically effective core 31 of the rotor 3 is designed in a ring-shaped and permanent-magnetic manner. For this purpose, the magnetically effective core 31 comprises a plurality of permanent magnets 311, which are each designed as a ring segment, the totality of the permanent magnets 311 complementing each other to form a ring. Each permanent magnet 311 is magnetized in radial direction, wherein adjacent permanent magnets 311 are magnetized in the opposite direction in each case, so that, seen in the circumferential direction, the permanent magnets 311 are alternately magnetized radially inwards and radially outwards. The magnetization of the individual permanent magnets 311 is indicated by the arrow without reference sign in the respective permanent magnet 311 in each case.

Those ferromagnetic or ferrimagnetic materials, which are magnetically hard, that is which have a high coercive field strength, are typically called permanent magnets. The coercive field strength is that magnetic field strength which is required to demagnetize a material. Within the framework of this application, a permanent magnet is understood as a material, which has a coercive field strength, more precisely a coercive field strength of the magnetic polarization, which amounts to more than 10,000 A/m.

The magnetically effective core 31 further has a reflux ring 312 made of a ferromagnetic material, which surrounds the permanent magnets 311 radially externally disposed, and which serves to guide the magnetic flux.

Both the ring-shaped reflux 22 and the stator poles 21 of the stator 2 as well as the reflux ring 312 of the magnetically effective core 31 of the rotor 3 are each made of a soil magnetic material because they serve as flux guiding elements for guiding the magnetic flux. Suitable soft magnetic materials are, for example, ferromagnetic or ferrimagnetic materials, i.e. in particular iron, nickel-iron or silicon-iron. In this case, in particular, the stator 2 is preferably designed as a stator sheet stack, in which the stator poles 21 and the reflux 22 are designed in sheet metal, i.e. they consist of several thin elements, which are stacked. The reflux ring 312 of the magnetically effective core 31 of the rotor 3 can also be designed in sheet metal.

During operation of the rotary drive 1, the magnetically effective core 31 of the rotor 3 interacts with the stator poles 21 of the stator 2 according to the principle of the bearingless motor described above, in which the rotor 3 is contactlessly magnetically drivable and is contactlessly magnetically levitatable with respect to the stator 2. For this purpose, the stator 2 is designed as a bearing and drive stator, with which the rotor is contactlessly magnetically drivable about the desired axis of rotation in the operating state—i.e. it can be set into rotation—and is contactlessly magnetically levitatable with respect to the stator 2.

The principle of the bearingless motor has become sufficiently well known to the person skilled in the art in the meantime, so that a detailed description of the function is no longer necessary. The principle of the bearingless motor means that the rotor 3 is completely magnetically levitated, wherein the stator 2 is designed as a bearing and drive stator, which is both the stator of the electric drive and the stator of the magnetic levitation. In this respect, the stator 2 comprises windings, here the coils 61, which are used to realize both the drive function and the levitation function. An electromagnetic rotating field can be generated by means of the coils 61, which on the one hand exerts a torque on the magnetically effective core 31 of the rotor 3, which causes its rotation, and which on the other hand exerts an arbitrarily settable shear force on the magnetically effective core 31 of the rotor 3, so that its radial position—i.e. its position in the radial plane—can be actively controlled or regulated. In the case of a bearingless motor, in contrast to classical magnetic bearings, the magnetic levitation and drive of the motor is realized by electromagnetic rotating fields, which exert a torque and an sellable shear force on the magnetically effective core 31 of the rotor 3. The rotating fields required for this can either be generated with different coils, or the rotating fields can be generated by mathematical superposition of the required fluxes and then with the aid of a single coil system, in this case the coils 61. In the case of a bearingless motor, it is therefore not possible to divide the electromagnetic flux generated by the coils 61 of the stator 2 into an electromagnetic flux, which only drives the rotor and an electromagnetic flux which only realizes the magnetic levitation of the rotor.

According to the principle of the bearingless motor, at least three degrees of freedom of the rotor 3 can be actively regulated, namely its position in the radial plane and its rotation. With respect to its axial deflection in axial direction A, the magnetically effective core 31 of the rotor 3 is passively magnetically stabilized by reluctance forces, i.e. it cannot be controlled. Also with respect to the remaining two degrees of freedom, namely tilts with respect to the radial plane perpendicular to the desired axis of rotation, the magnetically effective core 31 of the rotor 3 is also passively magnetically stabilized. The rotor 3 is thus passively magnetically levitated or passively magnetically stabilized and actively magnetically levitated in the radial plane (two degrees of freedom) by the interaction of the magnetically effective core 31 with the stator poles 21 in axial direction A and against tilting (a total of three degrees of freedom).

As is generally the case, an active magnetic levitation is also referred to in the framework of this application as one which is actively controllable or regulatable, for example by means of the electromagnetic rotating fields generated by the coils 61. A passive magnetic levitation or passive magnetic stabilization is one that cannot be controlled or regulated. The passive magnetic levitation or stabilization is based, for example, on reluctance forces, which bring the rotor 3 back to its equilibrium position when it is deflected from its equilibrium position, e.g. when it is displaced in axial direction or tilted.

Furthermore, the magnetic central plane C of the magnetically effective core 31 of the rotor 3 refers to that plane perpendicular to the axial direction A in which the magnetically effective core 31 of the rotor 3 is levitated in the operating state when the rotor 3 is not tilted. As a rule, in a ring-shaped magnetically effective core 31, the magnetic central plane C is the geometric central plane of the magnetically effective core 31 of the rotor 3, which is perpendicular to the axial direction A. That plane in which the magnetically effective core 31 of the rotor 3 is levitated in the stator 2 in the operating state is also referred to as the radial plane. The radial plane defines the x-y plane of a Cartesian coordinate system whose z-axis runs in axial direction A. If the magnetically effective core 31 of the rotor 3 is not tilted, the radial plane corresponds to the magnetic central plane C.

The radial position of the magnetically effective core 31 or the rotor 3 refers to the position of the rotor 3 in the radial plane.

A radial bearing or a radial support refers to a bearing of the rotor 3 with which the radial position of the rotor 3 can be stabilized, i.e. a bearing which supports the rotor 3 in the radial plane and thus with respect to its radial position.

An axial bearing or an axial support and an axial stabilization or an axial stabilization, respectively, refers to a bearing or a stabilization of the rotor 3 with which, on the one hand, the position of the rotor 3 is stabilized with respect to the axial direction A and with which, on the other hand, the rotor 3 is stabilized against tilting. Such tilts represent two degrees of freedom and designate deflections in which the momentary axis of rotation of the rotor 3 no longer points exactly in the axial direction A, but encloses an angle other than zero with the desired axis of rotation. In the case of a tilt, the magnetic central plane C no longer lies in or parallel to the radial plane, but the magnetic central plane C encloses an angle with the radial plane that is different from zero.

As already mentioned, the magnetically effective core 31 of the rotor 3 interacts with the stator poles 21 of the stator 2 according to the principle of the bearingless motor. The rotation of the rotor 3 is driven by this interaction. Furthermore, an active magnetic radial levitation of the rotor 3 is realized by the interaction, and the rotor 3 is passively magnetically stabilized against tilting.

With regard to the passive magnetic levitation of the rotor 3, it is preferred that the inner diameter of the magnetically effective core 31 of the rotor 3 is dimensioned such that it is at least 1.3 times as large as the height HR of the magnetically effective core 31 in axial direction A. In FIG. 4, IR denotes the inner radius of the ring-shaped magnetically effective core 31 of the rotor 3. The condition $2*IR \geq 1.3*HR$ should therefore be fulfilled, i.e. the inner diameter should be larger than or at least as large as 1.3 times the height HR.

Another advantageous measure with regard to the passive magnetic levitation of the rotor 3 is if the stator poles 21 are dimensioned such that the outer diameter SD (FIG. 4) of the stator 2 is at least 2.6 times as large as the height SH of the stator poles 21 in axial direction A. The outer diameter SD of the stator 2 is given by the extension of the stator poles 21 in radial direction. It is therefore advantageous if the condition $SD \geq 2.6*SH$ is fulfilled, i.e. the outer diameter SD of the stator 2 should be larger than or at least as large as 2.6 times the height SH of the stator poles 21.

According to the representation in FIG. 3 and FIG. 4, the height SH of the stator poles 21 is equal to the height HR of the magnetically effective core 31 of the rotor 3. Although this is a possible design, it is by no means necessary. There are also possible designs, in which the height SH of the stator poles 21 is smaller or larger than the height HR of the magnetically effective core 31 of the rotor 3.

The design of the magnetically effective core 31 of the rotor 3 and the stator 2 described above is a preferred design, but can only be understood as an example.

The magnetically effective core 31 of the rotor can also have other forms of magnetization. The magnetically effective core 31 can also be designed completely without permanent magnets, which contribute to the drive torque or to the generation of bearing forces. Thus, the magnetically effective core 31 can also be purely ferromagnetic, for example designed as a reluctance rotor.

There are also numerous designs known per se for the stator 2. For example, a permanent magnet or a plurality of permanent magnets can be provided in the stator, or the stator 2 can be designed as the stator of a temple motor, with L-shaped stator poles, wherein the long limbs of the L each extend in axial direction A, and the magnetically effective core of the rotor is arranged around the short radially outwardly oriented limbs of the L. The coils are then arranged around these long limbs, i.e. below the magnetic central plane of the magnetically effective core of the rotor.

The regulation or control of an electromagnetic rotary drive which is operated according to the principle of the bearingless motor, as well as the sensors required for this, e.g. position sensors and/or angle sensors, are well known to the person skilled in the art and therefore require no further explanation.

In order to significantly improve the passive magnetic stabilization of the rotor 3, in particular against tilting, an additional bearing stator 7 is provided according to the present invention, which interacts with a magnetically effective bearing ring 34 of the rotor 3. This will be explained in more detail below with reference to the first embodiment.

The rotor 3 comprises the magnetically effective bearing ring 34 being arranged externally disposed and spaced from the magnetically effective core 31 of the rotor 3. The bearing ring 34 is designed as a permanent magnetic ring with an inner radius LR, the ring being magnetized in axial direction A, as represented in the axial direction A upwards (FIG. 3 and FIG. 4). The magnetization of the bearing ring 34 is indicated by the arrows without a reference sign (in the bearing ring 34). The bearing ring 34 can be designed as a permanent magnetic ring in one piece, or segmented, i.e. composed of a plurality of ring-segment-shaped permanent magnets which together form the bearing ring 34 (see also FIG. 15 and FIG. 16). In the first embodiment, the bearing ring 34 is arranged in the magnetic central plane of the magnetically effective core 31 of the rotor 3, i.e. the geometric central plane LM of the bearing ring 34, which extends perpendicular to the axial direction A, lies in the magnetic central plane C of the magnetically effective core 31 of the rotor 3. The ring-shaped magnetically effective core 31 and the bearing ring 34 are arranged concentrically, i.e. they have a common center. With respect to the axial direction A, the bearing ring 34 is arranged centered to the magnetically effective core 31.

In the axial direction A, the bearing ring 34 has a height HL, which is preferably smaller than the height HR of the magnetically effective core 31. However, designs are also possible in which the height HL of the bearing ring 34 is equal to the height HR of the magnetically active core 31 or also larger than the height HR of the magnetically effective core 31.

The bearing ring 34 and the magnetically effective core 31 are connected to each other via an annular disk-shaped connecting element 35, which is arranged between the magnetically effective core 31 and the bearing ring 34 with respect to the radial direction. The connecting element 35 extends from the reflux ring 312 of the magnetically effective core 31 to the bearing ring 34 with respect to the radial direction. For this purpose, the connecting element 35 has an outer radius equal to the inner radius LR of the bearing ring 34.

The connecting element 35 includes a low-permeable material, i.e. of a material having only a low magnetic permeability (magnetic conductivity), so that the magnetically effective core 31 and the magnetically effective bearing ring 34 are magnetically decoupled from each other. This means that at least no substantial magnetic flux can flow between the bearing ring 34 and the magnetically effective core 31 through the connecting element 35.

For example, this low-permeable material may be a plastic, or a paramagnetic metal, e.g. aluminum or a stainless steel, or a diamagnetic metal, or also combinations of these materials. Within the framework of this application, —as is generally the case—those materials are low-permeable whose permeability number (relative permeability) deviates only slightly or not at all from 1 (permeability number of the vacuum). In any case, a low-permeable material has a permeability number that is less than 1.1. The low-permeable material of which the connecting element 35 is made forms flow barriers for the magnetic flux, because the low-permeable material has a significantly lower magnetic conductivity than, for example, the ferromagnetic material from which the reflux ring 312 is made.

In order to magnetically decouple the magnetically effective core 31 as well as possible from the bearing ring 34, it is advantageous if the distance in radial direction between the magnetically effective core 31 and the bearing ring 34 is as large as possible. Advantageously, the bearing ring 34 is dimensioned such that its inner radius LR is at least 1.1 times, preferably at least 1.3 times, and particularly preferably at least 1.6 times, the outer radius of the ring-shaped magnetically effective core 31.

Since it is sufficient for the invention to be understood, only the magnetically effective core 31, the connecting element 35 and the bearing ring 34 of the rotor 3 are shown in the drawing, for example in FIG. 3 and FIG. 4. It is understood, that the rotor 3 naturally can also comprise further components, e.g. jackets or encapsulations, which are preferably made of a plastic, or vanes for mixing, stirring or pumping fluids (see e.g. FIG. 28), or holders for bodies to be rotated (see e.g. FIG. 23) or other components.

The additional bearing stator 7 comprises a magnetically effective stator ring 71 designed and arranged to interact with the bearing ring 34 of the rotor 3. The stator ring 71 is arranged stationary, i.e. it does not rotate. In the first embodiment, the stator ring 71 is arranged radially externally disposed and spaced from the bearing ring 34 of the rotor 3 in such a way that it surrounds the bearing ring 34. The stator ring 71 is designed as a permanent magnetic ring having an inner radius SR, wherein the ring 71 is magnetized in axial direction A, as represented in axial direction A downwards (FIG. 3 and FIG. 4). The magnetization of the stator ring 71 is indicated by the arrows without a reference sign (in the stator ring 71). The bearing ring 34 and the stator ring 71 are thus each magnetized in axial direction A, whereby the magnetization of the stator ring 71 is directed in the opposite direction to the magnetization of the bearing ring 34.

Figure 15:
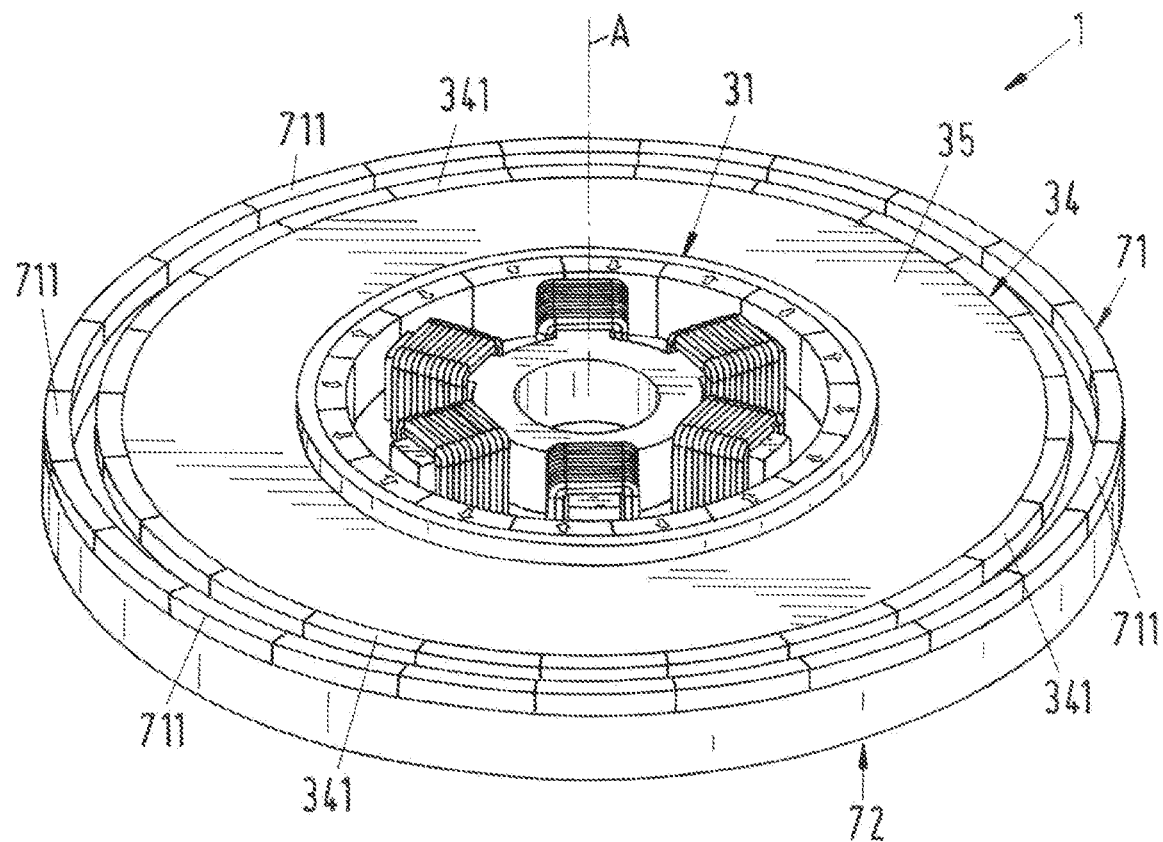
FIG. 15 is a variant for the design of the bearing ring and the stator ring in a perspective representation.
Figure 16:
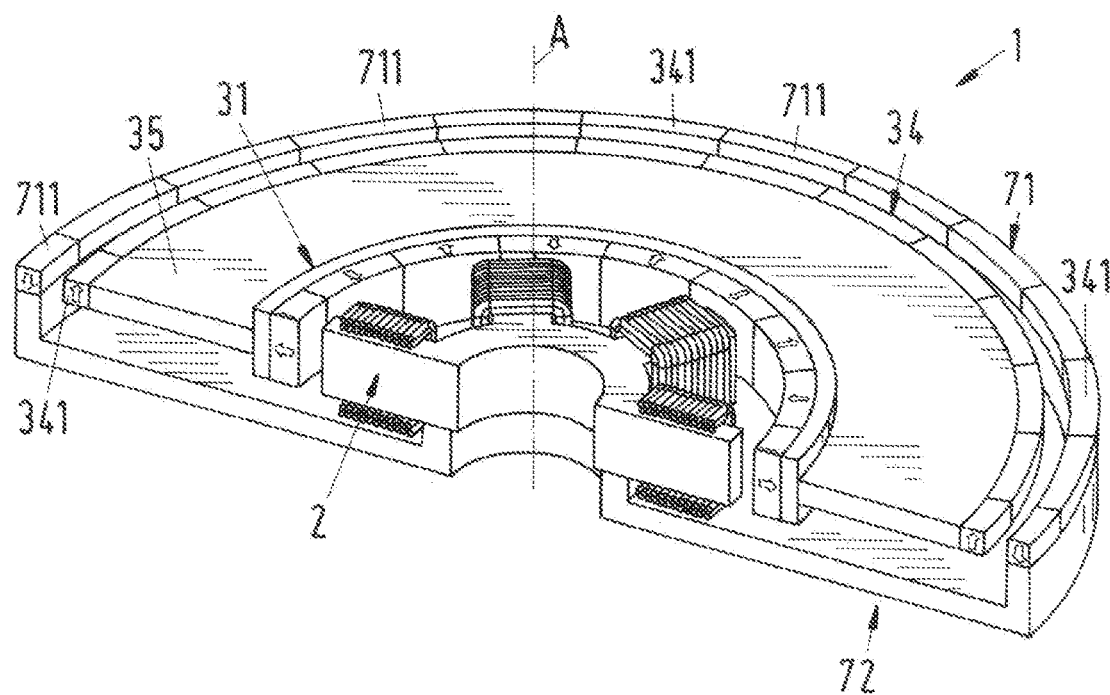
FIG. 16 is the variant from FIG. 15 in a perspective sectional representation.

The stator ring 71 can be designed as a permanent magnetic ring in one piece, or segmented, i.e. composed of a plurality of ring-segment-shaped permanent magnets which together form the stator ring 71 (see also FIG. 15 and FIG. 16). In the first embodiment, the stator ring 71 is arranged in the magnetic central plane C of the magnetically effective core 31 of the rotor 3, i.e. the geometric central plane SM of the stator ring 71, which extends perpendicular to the axial direction A, lies in the magnetic central plane C of the magnetically effective core 31 of the rotor 3. The bearing ring 34 and the stator ring 71 are arranged concentrically, i.e. they have a common center. With respect to the axial direction A, the stator ring 71 is arranged centered with respect to the bearing ring 34.

In the first embodiment, the ring-shaped magnetically effective core 31, the bearing ring 34 and the stator ring 71 are thus arranged concentrically in the magnetic rotor plane C, the inner radius IR of the magnetically effective core 31 being smaller than the inner radius LR of the bearing ring 34 and the inner radius IR of the bearing ring 34 being smaller than the inner radius SR of the stator ring.

The inner radius SR of the stator ring 71 is dimensioned such that the stator ring 71 surrounds the bearing ring 34 with as little clearance as possible, so that the magnetic air gap between the bearing ring 34 and the stator ring 71 is as small as possible in radial direction.

On the one hand, the bearing ring 34 should be able to rotate freely within the stator ring 71, on the other hand, the magnetic resistance caused by the gap between the bearing ring 34 and the stator ring 71 should be as low as possible in order to enable an efficient flux guidance of the magnetic flux between the bearing ring 34 and the stator ring 71. The width of the gap between the bearing ring 34 and the stator ring 71 in radial direction is at most a few millimeters or only one millimeter or even less.

In axial direction A, the stator ring 71 has a height HS which is preferably the same as the height HL of the bearing ring 34. However, designs are also possible in which the height HS of the stator ring 71 is smaller or larger than the height HL of the bearing ring 34.

Preferably, but not necessarily, the magnetically effective core 31, the bearing ring 34 and the stator ring 71 each have a rectangular cross-sectional surface perpendicular to their respective circumferential direction.

The additional bearing stator 7 further comprises a supporting body 72 for supporting the stationary stator ring 71. The supporting body 72 forms a mechanically stable connection between the stator 2 and the magnetically effective stator ring 71 of the additional bearing stator 7.

The supporting body 72 comprises a disk-shaped radial part 721 extending outwards in radial direction from the stator 2 and a ring-shaped axial part 722 extending upwards in the axial direction A from the radially externally disposed edge of the radial part 721 as represented (FIG. 3 and FIG. 4). The stator ring 71 is attached on the axial part 722. At its radially internally disposed edge, the disk-shaped radial part 721 has a ring-shaped connecting piece 723, with which the supporting body 72 is fixed to the stator 2. For this purpose, the connecting piece 723 can, for example, be attached to the ring-shaped reflux 22 of the stator 2, or also to a stator housing (not shown) of the stator 2.

As shown in FIG. 3 and FIG. 4, the supporting body 72 extends radially outwards below the coils 61 beyond the bearing ring 34 of the rotor 3 and then upwards in the axial direction, so that the stator ring 71 fixed on the supporting body 72 is opposite the bearing ring 34 or surrounds the bearing ring 34. The stator ring 71 is connected to the stator 2 by the supporting body 72 and fixed with respect to the stator 2. Preferably, the supporting body 72 is designed in one piece, i.e. the connecting piece 723, the radial part 721 and the axial part 722 are designed in one piece as a structural unit.

In order to magnetically decouple the stator ring 71 from the stator 2 and in particular from the reflux 22 and the stator poles 21, the supporting body 72 includes—in the analogously same way as explained for the connecting element 35—of a low-permeable material, i.e. of a material having only low magnetic permeability (magnetic conductivity). For example, the low-permeable material can be a plastic, or a paramagnetic metal, e.g. aluminum or a stainless steel, or a diamagnetic metal, or also combinations of these materials.

In the operating state of the electromagnetic rotary drive 1, an additional passive magnetic axial levitation or an additional passive magnetic axial stabilization of the rotor 3 is realized by the interaction of the bearing ring 34 and the stator ring 71. in doing so, the stabilization of the rotor 3 against tilting in particular can be significantly increased, for example by at least a factor of twenty. This increase, in particular in tilt stiffness, means that the entire passive magnetic axial levitation of the rotor 3 can absorb or compensate torques, which cause tilts, which are at least by a factor of twenty larger than comparable embodiments without the bearing ring 34 and the stator ring 71. In this respect, it is particularly advantageous that the influence of the additional magnetic axial levitation (bearing ring 34 and stator ring 71) on the radial bearing of the rotor 3 can be compensated by the active radial bearing, which is realized by the interaction of the magnetically effective core 31 of the rotor 3 with the stator poles 21.

The electromagnetic rotary drive 1 thus comprises two magnetic circuits which are separated or magnetically decoupled from each other by the low-permeable connecting element 35 and the low-permeable supporting body 72: The magnetically effective core 31 magnetically interacts with the stator poles 21 according to the principle of the bearingless motor, and the bearing ring 34 of the rotor 3 magnetically interacts with the stator ring 71, whereby an additional passive magnetic axial stabilization or axial bearing is realized.

FIG. 5 shows in a perspective sectional representation a variant of the first embodiment in a representation corresponding to FIG. 3. For a better understanding, FIG. 6 still shows a schematic section in axial direction through this variant.

In the variant shown in FIG. 5 and FIG. 6, the bearing ring 34 of the rotor 3 is arranged with respect to the axial direction A at a distance D different from zero to the magnetic central plane C of the magnetically effective core 31 of the rotor 3. This means that the bearing ring 34 is arranged such that the geometric central plane LM of the bearing ring 34 lies no longer in the magnetic central plane C, but that the geometric central plane LM of the bearing ring 34 is arranged parallel by the distance D to the magnetic central plane C. According to the representation (FIG. 5, FIG. 6), the bearing ring 34 is arranged above the ring-shaped magnetically effective core 31. It is understood that the bearing ring 34 can of course also be arranged in the analogously same way below the magnetically effective core 31 as represented (FIG. 5, FIG. 6).

In this variant, the two rings, namely the magnetically effective core 31 and the bearing ring 34, are thus no longer arranged concentrically, but are offset from each other by the distance D with respect to the axial direction A. In this respect, the centers of the bearing ring 34 and the magnetically effective core 31 lie on the same axis, i.e. the axis of rotation of the rotor 3, but are axially spaced from each other. The bearing ring 34 is thus arranged centered to the magnetically effective core 31 with respect to the radial direction and spaced apart with the distance D to the magnetically effective core 31 with respect to the axial direction.

The connecting element 35 is arranged between the bearing ring 34 and the magnetically effective core 31 and connects the hearing ring 34 to the magnetically effective core 31. The connecting element 35 can optionally and as represented in FIG. 4 and FIG. 5 overlap the magnetically effective core 31, which means that the connecting element 35 extends in radial direction up to the radially internally disposed edge of the magnetically effective core 31.

The stator ring 71 of the additional bearing stator 7 is arranged concentrically with the bearing ring 34, so that the geometric central plane SM of the stator ring 71 lies in the geometric central plane LM of the bearing ring 34. As a result, the stator ring 71 is also arranged with respect to the axial direction A at the distance D from the magnetic central plane C. The stator ring 71 surrounds the bearing ring 34 so that the stator ring 71 and the bearing ring 34 are aligned with each other with respect to the radial direction.

In order to limit the destabilizing effect of the additional axial bearing (bearing ring 34 and stator ring 71) on the additional stabilization against tilting to a value suitable for practical use, those embodiments are preferred in which the distance D between the bearing ring 34, more precisely its geometric central plane LM, and the magnetic central plane C is at most one quarter and particularly preferably at most one fifth of the inner radius LR of the bearing ring 34. Preferably, the geometric condition is fulfilled that D≤LR/4 and particularly preferably that D≤LR/5.

Figure 7:
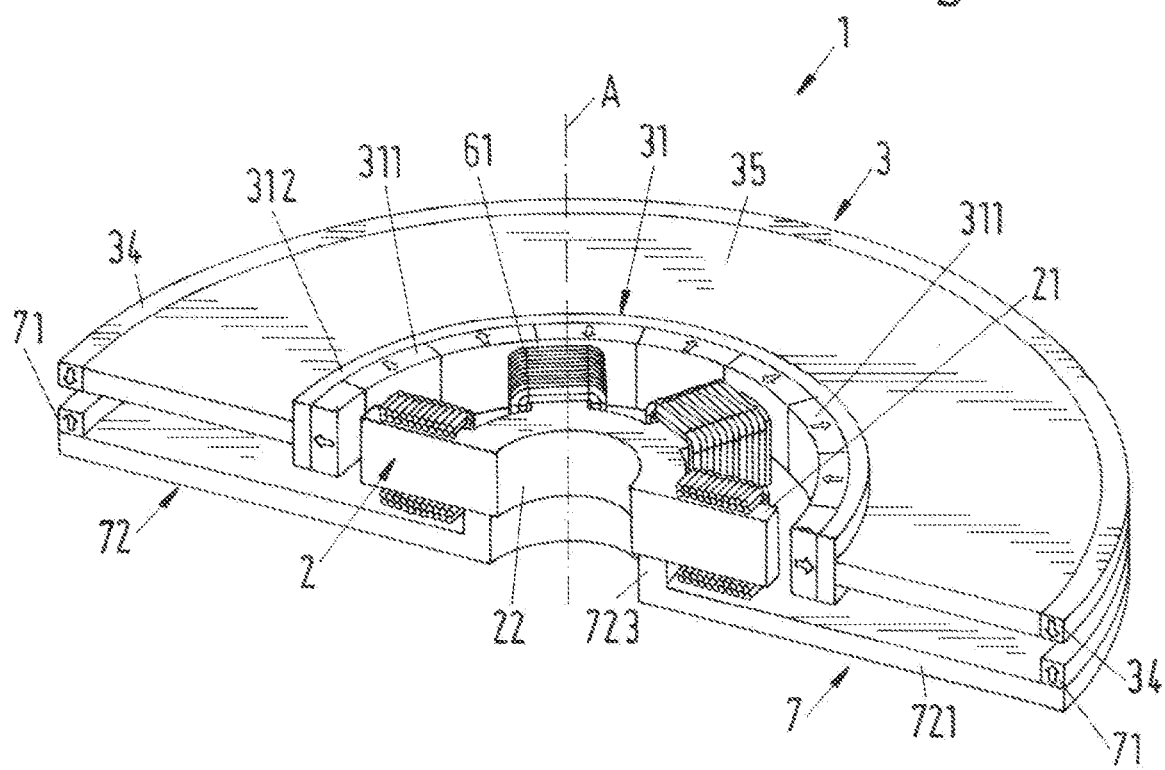
FIG. 7 is a perspective sectional representation of a second embodiment of an electromagnetic rotary drive according to the present invention.

FIG. 7 shows in a perspective sectional view a second embodiment of a rotary drive according to the invention in a representation corresponding to that in FIG. 3. For a better understanding, FIG. 8 still shows a schematic representation of a section in axial direction A through this second embodiment. In the following, only the differences to the first embodiment will be looked at. Identical parts or parts of the same function in the second embodiment are designated with the same reference signs as in the first embodiment or its variants. In particular, the reference signs have the same meaning as they are already explained in connection with the embodiment. It is understood that all previous explanations of the first embodiment and its variants apply in the same way or analogously same way to the second embodiment.

The second embodiment differs from the first embodiment by the fact that in the second embodiment, the stator ring 71 of the additional bearing stator 7 is arranged spaced from the bearing ring 34 of rotor the 3 with respect to the axial direction A. This means that the stator ring 71 is arranged such that the geometric central plane SM of the stator ring 71 no longer lies in the geometric central plane LM of the bearing ring 34, but that the geometric central plane SM of the stator ring 71 is arranged parallel to the geometric central plane LM of the bearing ring 34 with a distance E different from zero. According to the representation (FIG. 7, FIG. 8), the stator ring 71 is arranged below the bearing ring 34. It is understood that the stator ring 71 can also be arranged in the analogously same way above the bearing ring 34 according to the representation (FIG. 7, FIG. 8).

The stator ring 71 and the bearing ring 34 are no longer arranged concentrically, but are offset from each other by the distance E with respect to the axial direction A. In this respect, the centers of the bearing ring 34 and the stator ring 71 lie on the same axis, namely the axis of rotation of the rotor 3, but are axially spaced from each other. Particularly preferably, the stator ring 71 has an inner radius SR, which is the same size as the inner radius LR of the bearing ring 34. The bearing ring 34 and the stator ring 71 are arranged in alignment with each other with respect to the axial direction A, so that the bearing ring 34 and the stator ring 71 are arranged opposite each other or one above the other in axial direction A.

Figure 8:
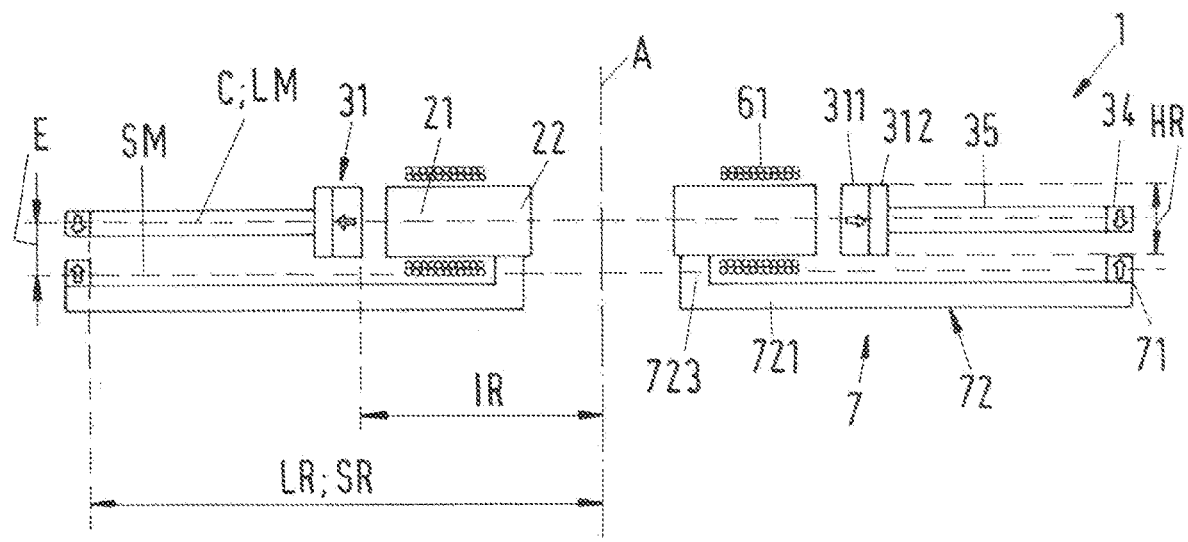
FIG. 8 is a schematic section in the axial direction through the second embodiment from FIG. 7.

In the embodiment represented in FIG. 7 and FIG. 8, the bearing ring 34 is arranged in the magnetic central plane C, i.e. concentrically with the magnetically effective core 31. In this arrangement, the stator ring 71 is arranged with respect to the axial direction A at the distance E different from zero to the magnetic central plane C, i.e. the geometric central plane SM of the stator ring 71 lies parallel to the magnetic central plane C and has the distance E from it.

Since the stator ring 71 in the embodiment shown in FIG. 7 and FIG. 8 is arranged below the bearing ring 34, the axial part 722 can optionally be dispensed with on the supporting body 72.

Figure 9:
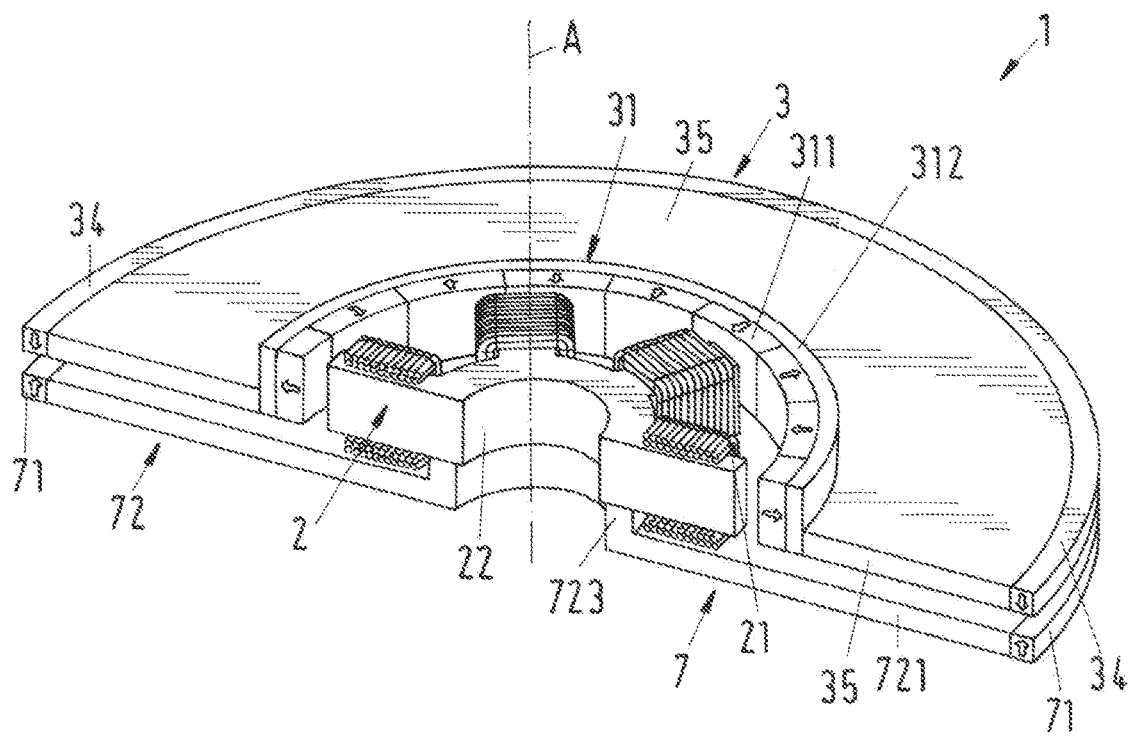
FIG. 9 is a variant of the second embodiment in a perspective sectional representation.

FIG. 9 shows in a perspective sectional representation a variant of the second embodiment in a representation corresponding to FIG. 7. For a better understanding, FIG. 10 still shows a schematic section in axial direction through this variant.

Figure 10:
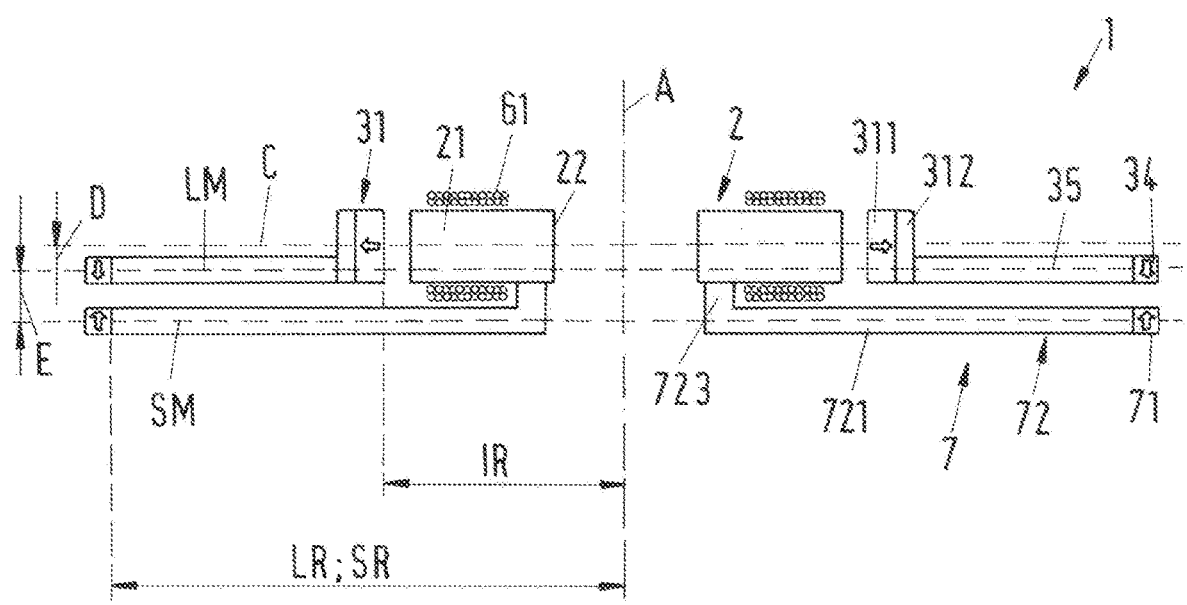
FIG. 10 is a schematic section in the axial direction through the variant from FIG. 9.

In the variant of the second embodiment represented in FIG. 9 and FIG. 10, the bearing ring 34 of the rotor 3 is arranged with respect to the axial direction A at a distance D different from zero to the magnetic central plane C of the magnetically effective core 31 of the rotor 3. This means that the bearing ring 34 is arranged such that the geometric central plane LM of the bearing ring 34 lies no longer in the magnetic central plane C, but that the geometric central plane LM of the bearing ring 34 is arranged parallel with the distance D to the magnetic central plane C. According to the representation (FIG. 9, FIG. 10), the bearing ring 34 is arranged below the ring-shaped magnetically effective core 31. It is understood that the bearing ring 34 can of course also be arranged in the analogously same way above the magnetically effective core 31 as represented (FIG. 9, FIG. 10), for example in an analogously corresponding way as explained in connection with FIG. 5 and FIG. 6.

In this variant, the two rings, namely the magnetically effective core 31 and the bearing ring 34, are thus no longer arranged concentrically, but are offset from each other by the distance D with respect to the axial direction A. In this respect, the centers of the bearing ring 34 and the magnetically effective core 31 lie on the same axis, namely the axis of rotation of the rotor 3, but are axially spaced from each other. The bearing ring 34 is thus arranged centered to the magnetically effective core 31 with respect to the radial direction and spaced apart with the distance D to the magnetically effective core 31 with respect to the axial direction.

The stator ring 71 of the additional bearing stator 7, which is arranged below the bearing ring 34 with respect to the axial direction A, has a distance D+E from the magnetic central plane C in this variant. The three rings, namely the magnetically effective core 31, the bearing ring 34 and the stator ring 71, are each arranged at different positions with respect to the axial direction A and parallel to each other. Their centers all lie on the same axis, namely the axis of rotation of the rotor 3 (if it is centered and not tilted with respect to the stator). The geometric central plane SM of the stator ring 71 is below the geometric central plane LM of the bearing ring 34 with the distance E, and this geometric central plane LM is below the magnetic central plane C with the distance D.

In order to limit the destabilizing effect of the additional axial bearing (bearing ring 34 and stator ring 71) on the additional stabilization against tilting to a value suitable for practical use, those embodiments are preferred in which the distance D between the bearing ring 34, more precisely its geometric central plane LM, and the magnetic central plane C is at most one quarter and particularly preferably at most one fifth of the inner radius LR of the bearing ring 34. Preferably, the geometric condition is thus fulfilled that D≤LR/4 and particularly preferably that D≤LR/5.

As an optional design for the variant represented in FIG. 9 and FIG. 10, the stator ring 71 is attached radially externally disposed to the radially outer boundary surface of the radial part 721 of the supporting body 72.

It is understood that the measures and designs described in connection with the first embodiment and its variant can be combined analogously with the measures and designs described in connection with the second embodiment and its variant.

In the following, variants for the design of the connecting element 35 and/or for the design of the supporting body 72 are explained with reference to FIG. 11-FIG. 14. It is understood that these variants can be used both for the first embodiment and its variant and for the second embodiment and its variant.

Figure 11:
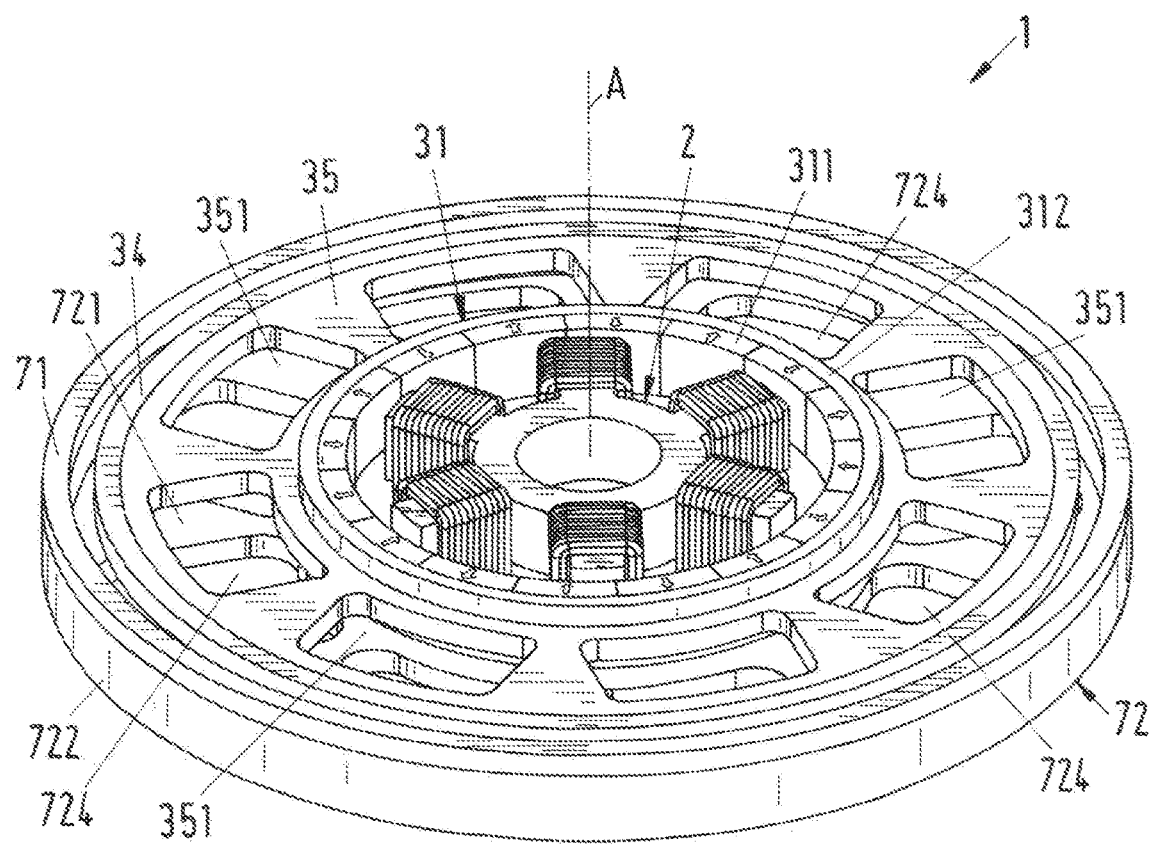
FIG. 11 is a first variant for the design of the connecting element in a perspective representation.
Figure 12:
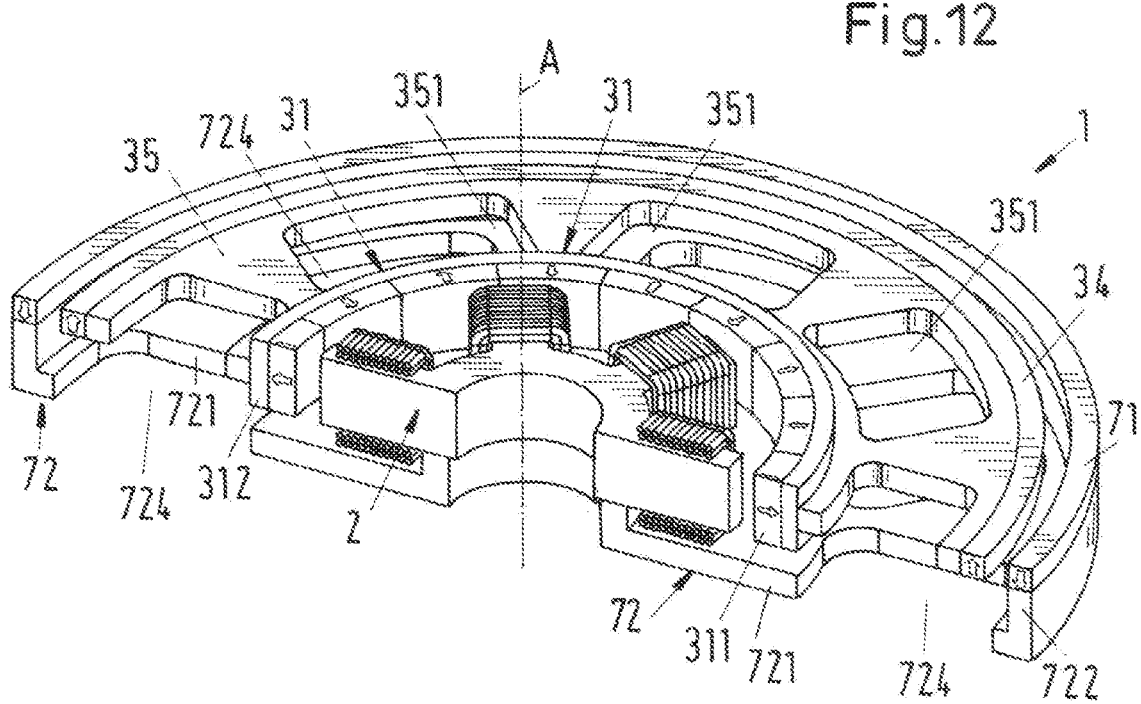
FIG. 12 is the first variant from FIG. 11 in a perspective sectional representation.

FIG. 11 shows a first variant for the design of the connecting element 35 and/or for the design of the supporting body 72 in a perspective representation. FIG. 12 shows this first variant in a perspective sectional representation with a section in axial direction A.

In this first variant, the connecting element 35, which is arranged between the magnetically effective core 31 and the bearing ring 34 of the rotor 3 with respect to the radial direction, is not designed as a solid disk but has a plurality of recesses 351, each of which extending entirely through the connecting element 35 with respect to the axial direction A. With an exemplary nature, eight essentially identical recesses 351 are provided here. The recesses 351 are arranged equidistantly with respect to the circumferential direction of the connecting element 35. Each recess 351 has the shape of a ring segment, the common center of all ring segments corresponding with the geometric center of the disk-shaped connecting element 35.

The material requirements and thus also the weight of the connecting element 35 can be reduced by the recesses 351. The recesses 351 are designed, dimensioned and arranged such that the material in between of the connecting element 35 still forms a sufficiently stable mechanical connection to attach the bearing ring 34 to the magnetically effective core 31.

In an analogous way, the supporting body 72, more precisely the radial part 721 of the supporting body 72, is provided with a plurality of second recesses 724, each of which extending entirely through the radial part 721 of the connecting element 35 with respect to the axial direction A. With an exemplary nature, eight essentially identical second recesses 724 are provided here. The second recesses 724 are arranged equidistantly with respect to the circumferential direction of the radial part 721. Each second recess 724 has the shape of a ring segment, the common center of all ring segments corresponding with the geometric center of the disk-shaped radial part 721 of the supporting body 72.

The material requirements and thus also the weight of the supporting body 72 can be reduced by the second recesses 724. The second recesses 724 are designed, dimensioned and arranged such that the material in between of the radial part 721 still forms a sufficiently stable mechanical connection to attach the stator ring 71 to the stator 2.

Of course, such embodiments are also possible, in which only the recesses 351 are provided in the connecting element 35, or only the second recesses 724 in the supporting body 72.

Figure 13:
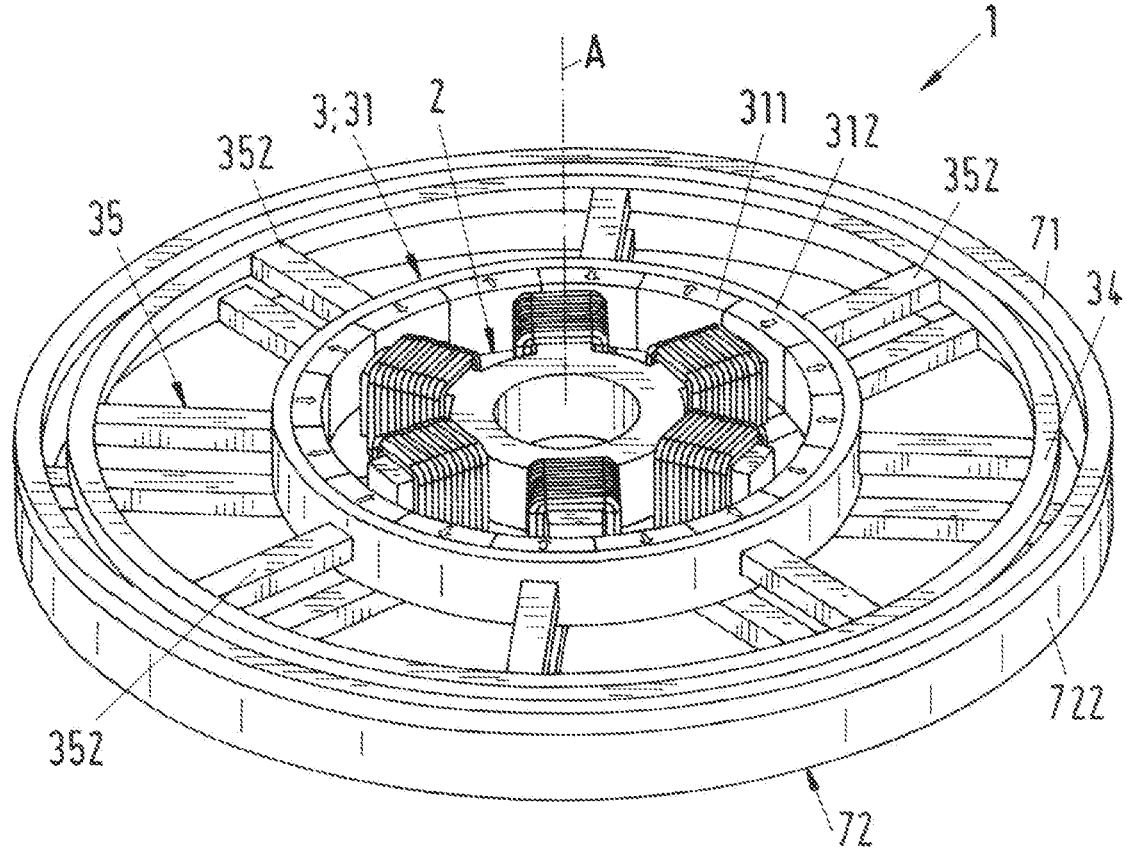
FIG. 13 is a second variant for the design of the connecting element in a perspective representation.
Figure 14:
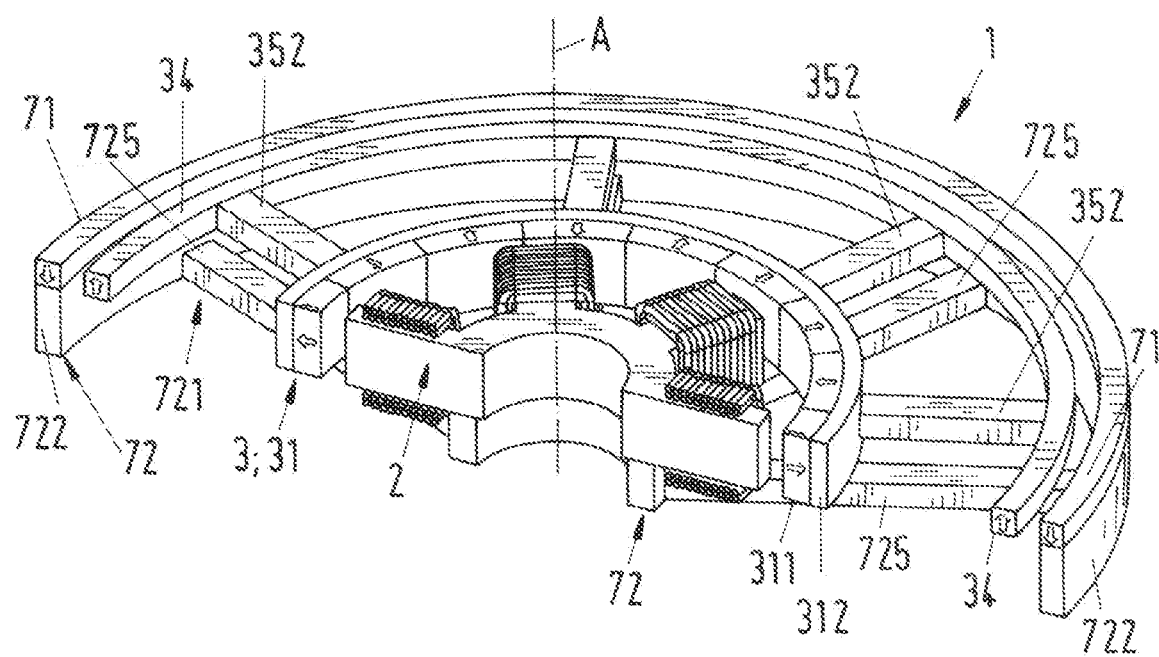
FIG. 14 is the second variant from FIG. 13 in a perspective sectional representation.

FIG. 13 shows a second variant for the design of the connecting element 35 and/or for the design of the supporting body 72 in a perspective representation. FIG. 14 shows this second variation in a perspective sectional representation with a section in axial direction A.

In this second embodiment, the connecting element 35 has a plurality of spokes 352, each of which extending in radial direction between the magnetically effective core 31 of the rotor 3—or optionally a jacket of the magnetically effective core 31, not shown—and the bearing ring 34 of the rotor 3—or optionally a jacket of the bearing ring 34, not shown. Each spoke 352 connects the magnetically effective core 31 to the bearing ring 34.

With an exemplary nature, eight essentially identical spokes 352 are provided here. The spokes 352 are arranged equidistantly with respect to the circumferential direction of the connecting element 35. The spokes 352 are designed, dimensioned and arranged such that they form a sufficiently stable mechanical connection to attach the bearing ring 34 to the magnetically effective core 31.

In an analogous way, the supporting body 72, more precisely the radial part 721 of the supporting body 72, is provided with a plurality of second spokes 725, each of which extending in radial direction between the stator 2—or optionally a stator housing, not shown—and the ring-shaped axial part 722 of the supporting body 72. Each second spoke 725 connects the stator 2—or a stator housing, not shown—with the axial part 722 of the supporting body 72.

With an exemplary nature, eight essentially identical second spokes 725 are provided here. The second spokes 725 are arranged equidistantly with respect to the circumferential direction of the supporting body 72. The second spokes 725 are designed, dimensioned and arranged such that they form a sufficiently stable mechanical connection to attach the stator ring 71 to the stator 2.

Of course, such embodiments are also possible, in which only the spokes 352 are provided in the connecting element 35, or only the second spokes 725 in the supporting body 72.

In FIG. 15 and FIG. 16, a variant for the design of the bearing ring 34 and/or for the design of the stator ring 71 is explained. It is understood that this variant can be used both for the first embodiment and its variant and also for the second embodiment and its variant.

According to this variant, the bearing ring 34 and the stator ring 71 are each designed segmented. FIG. 15 shows this variant in a perspective representation using the example of an embodiment of the rotary drive 1, which otherwise corresponds to the embodiment represented in FIG. 3. For a better understanding, FIG. 16 still shows this variant from FIG. 15 in a perspective sectional representation.

Both the bearing ring 34 and the stator ring 71 each consist of a permanent magnetic material and are each designed segmented with a plurality of permanent magnets 341 or 711.

Each of the permanent magnets 341 of the bearing ring 34 is designed as a ring segment in each case. All permanent magnets 341 are magnetized in the same direction, here in axial direction A upwards. This is indicated in FIG. 16 by the arrows without a reference sign in the bearing ring 34, which indicate the direction of magnetization. With an exemplary nature, the bearing ring 34 consists of twenty-four identical individual permanent magnets 341, each of which is designed in the form of a ring segment. The permanent magnets 341 are arranged in the circumferential direction, wherein two adjacent permanent magnets 341 each directly adjoin each other, so that the totality of the permanent magnets 341 complement each other to form the permanent magnetic bearing ring 34.

Each of the permanent magnets 711 of the stator ring 71 is designed as a ring segment. All permanent magnets 711 are magnetized in the same direction, here in axial direction A downwards. This is indicated in FIG. 16 by the arrows without a reference sign in the stator ring 71, which indicate the direction of magnetization. With an exemplary nature, the stator ring 71 consists of twenty-four identical individual permanent magnets 711, each of which is designed in the form of a ring segment. The permanent magnets 711 are arranged in the circumferential direction, wherein two adjacent permanent magnets 711 each directly adjoin each other, so that the totality of the permanent magnets 711 complement each other to form the permanent magnetic stator ring 71.

The segmented design of the bearing ring 34 or the stator ring 71 is preferred, because it enables easier manufacturing, but it is of course also possible to design the bearing ring 34 and/or the stator ring 71 as a one-piece ring.

If the bearing ring 34 and/or the stator ring 71 is designed permanent magnetically, it is not necessary that the respective ring 34 or 71 is formed entirely of a permanent magnetic material or comprises only permanent magnets. Such embodiments are also possible, in which a permanent magnetic bearing ring 34 and/or a permanent magnetic stator ring 71 each comprise a plurality of permanent magnets between which ferromagnetic connecting pieces are arranged. In a segmented design of the respective ring 34 or 71, several permanent magnetic ring segments, which are connected to each other by ferromagnetic ring segments, can then be provided.

As already mentioned, it is preferred but not necessary that both the bearing ring 34 and the stator ring 71 each are designed as permanent magnetic rings. Such embodiments are also possible, in which either only the bearing ring 34 or only the stator ring 71 is designed permanent magnetically. If only the bearing ring 34 is permanent magnetic, then the stator ring 71 is designed ferromagnetically, for example as an iron ring or ring made of another ferromagnetic material. If only the stator ring 71 is permanent magnetic, then the bearing ring 34 is designed ferromagnetically, for example as an iron ring or ring made of another ferromagnetic material.

If the bearing ring 34 or the stator ring 71 is designed ferromagnetically, this ring 34 or 71 can be designed as a one-piece ring or as segmented ring in the analogously same way as described above.

For the preferred embodiment, in which both the bearing ring 34 and the stator ring 71 are each designed permanent magnetically, the same form of magnetization of the stator ring 71 or the bearing ring 34 is always shown in FIG. 3-FIG. 16, namely that the bearing ring 34 and the stator ring 71 are each magnetized in the axial direction A, the magnetization of the stator ring 71 (according to the representation downwardly) being directed oppositely to the magnetization of the bearing ring 34 (according to the representation upwardly). In addition to this preferred embodiment, there are other preferred embodiments with regard to the magnetization of the stator ring 71 and the bearing ring 34. In the following, different variants for the magnetization of the bearing ring 34 and the stator ring 71 are explained with reference to FIG. 17-FIG. 21. It is understood that these variants can be used both for the first embodiment and its variant and for the second embodiment and its variant.

FIG. 17-FIG. 21 each show a schematic sectional representation of an embodiment of the rotary drive 1. In each of FIG. 17-FIG. 21, the arrows without a reference sign in the bearing ring 34 indicate the direction of magnetization of the bearing ring 34, and the arrows without a reference sign in the stator ring 71 indicate the direction of magnetization of the stator ring 71.

With reference to the first embodiment, FIG. 17 shows a variant in which the stator ring 71 and the bearing ring 34 are each magnetized in the radial direction, the magnetization of the stator ring 71 and the magnetization of the bearing ring 34 being directed in the same direction, namely radially outwards in each case.

With reference to the first embodiment, FIG. 18 shows a variant in which the stator ring 71 is magnetized in radial direction and the bearing ring 34 is magnetized in the axial direction A. The magnetization of the stator ring 71 is directed radially outwards and the magnetization of the bearing ring 34 is directed upwards in the axial direction A.

With reference to the first embodiment, FIG. 19 shows a variant in which the stator ring 71 is magnetized in axial direction A and the bearing ring 34 is magnetized in radial direction. The magnetization of the stator ring 71 is directed downwards in axial direction A and the magnetization of the bearing ring 34 is directed radially outwards.

With reference to the second embodiment, FIG. 20 shows a variant in which the stator ring 71 and the bearing ring 34 are each magnetized in axial direction, the magnetization of the stator ring 71 and the magnetization of the bearing ring 34 being oppositely directed. The magnetization of the stator ring 71 is directed downwards in the axial direction A and the magnetization of the bearing ring 34 is directed upwards in the axial direction A.

With reference to the second embodiment, FIG. 21 shows a variant in which the stator ring 71 and the bearing ring 34 are each magnetized in radial direction, the magnetization of the stator ring 71 and the magnetization of the bearing ring 34 being directed in the same direction, namely radially outwards in each case.

A rotational device for treating a surface of a disk-shaped body is further proposed by the invention, with which rotational device the body is rotatable for treatment, which is characterized in that the rotational device comprises an electromagnetic rotary drive 1 being designed according to the invention, wherein the rotor 3 comprises a holder for the disk-shaped body.

Figure 22:
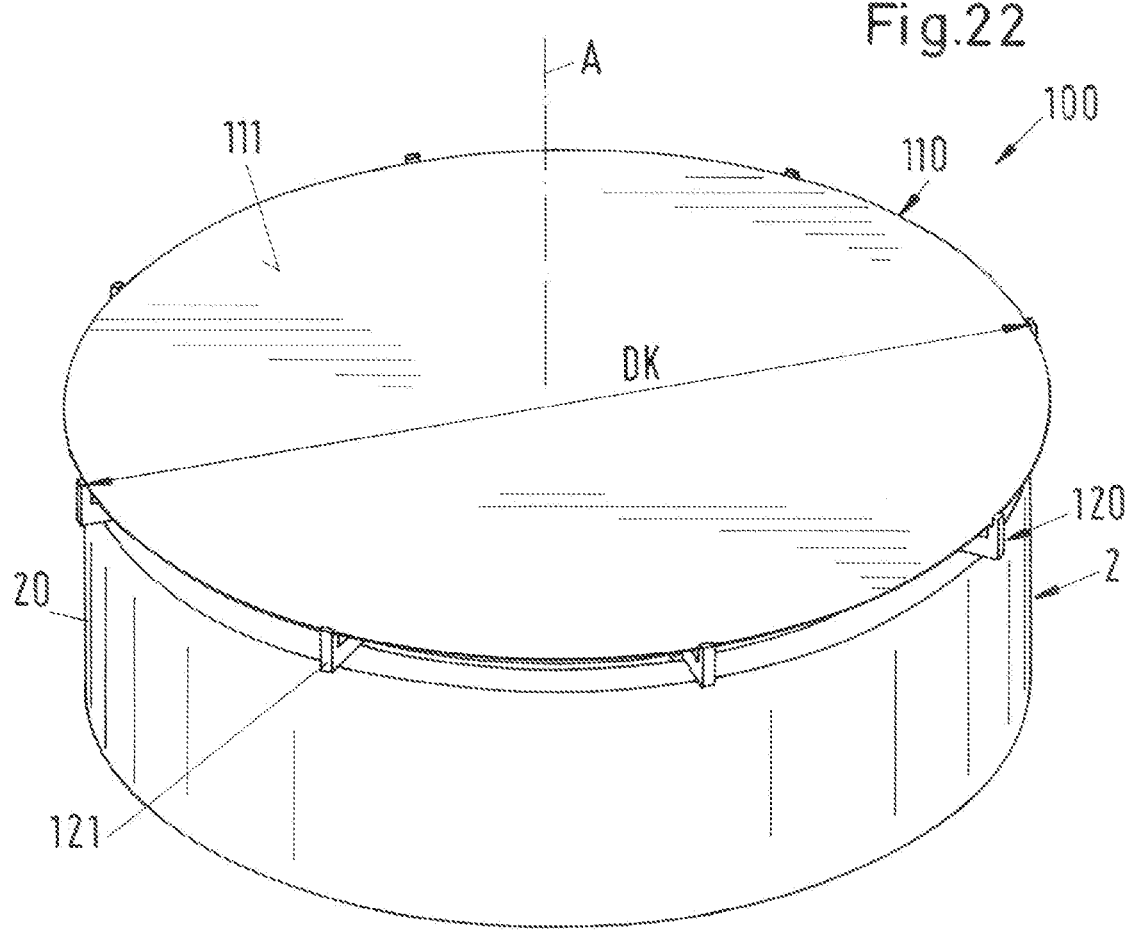
FIG. 22 is a perspective representation of an embodiment of a rotational device according to the invention being designed for treating a surface of a disk-shaped body.

FIG. 22 shows in a perspective representation an embodiment of a rotational device for treating a surface of a disk-shaped body. The rotational device is referred to as a whole with the reference sign 100 and the disk-shaped body with the reference sign 110. For a better understanding, FIG. 23 still shows a perspective sectional representation of the rotational device 100 in a section in axial direction A and FIG. 24 shows a schematic sectional representation of the rotational device 100 in a section along the axial direction A.

In the following, reference is made with an exemplary nature to the application case from the semiconductor industry, which is important for practice, that the body 110 to be treated is a wafer 110 for the production of electronic components, i.e. a thin, disk-shaped body. The rotational device 100 can be used for treating the surface 111 of the wafer 110, for example to apply the surface 111 with fluids such as suspensions in a controlled manner. As examples, chemical-mechanical polishing processes (CMP) by slurry, cleaning and/or etching of wafers 110, application of photoresist or removal of photoresist with solvents are mentioned here. In addition to these wet processes, in which the wafer 110 is applied with a fluid, the rotational device 100 is also suitable for dry processes. Examples of such dry processes in which the wafer 110 is rotated are: plasma etching, rapid thermal processing (RTP), atomic layer deposition (ALD), chemical vapor deposition (CVD), or physical vapor deposition (PVD).

In such processes, the wafers 110 are typically set into rapid rotation in a process chamber 20 and then applied for treating with the respective fluid or with the respective radiation, for example with a plasma or with the substances to be separated. The rotational device 100 according to the invention is particularly suitable for such processes in which the process chamber 20 must be evacuated, and especially for processes that are carried out in high vacuum.

Typically, in all these processes, the stator 2 and the additional bearing stator 7 are arranged outside the process chamber 20, while the rotor 3 is arranged inside the process chamber 20.

Figure 23:
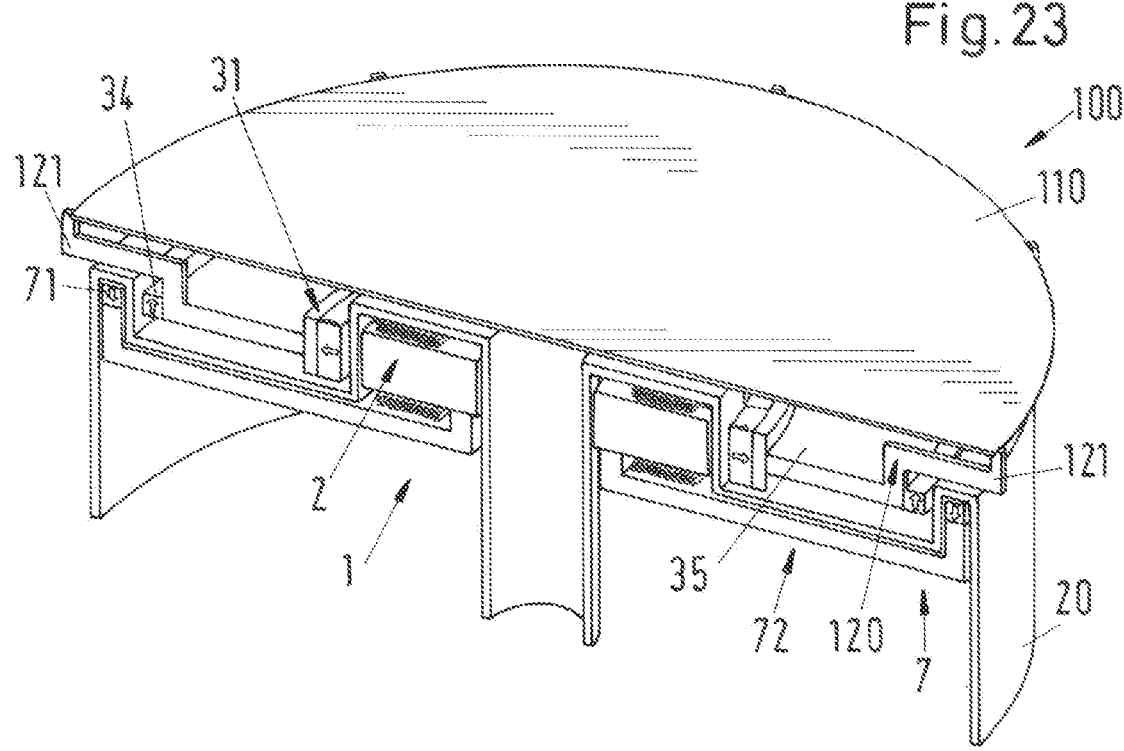
FIG. 23 is a perspective sectional representation of the embodiment from FIG. 22.
Figure 24:
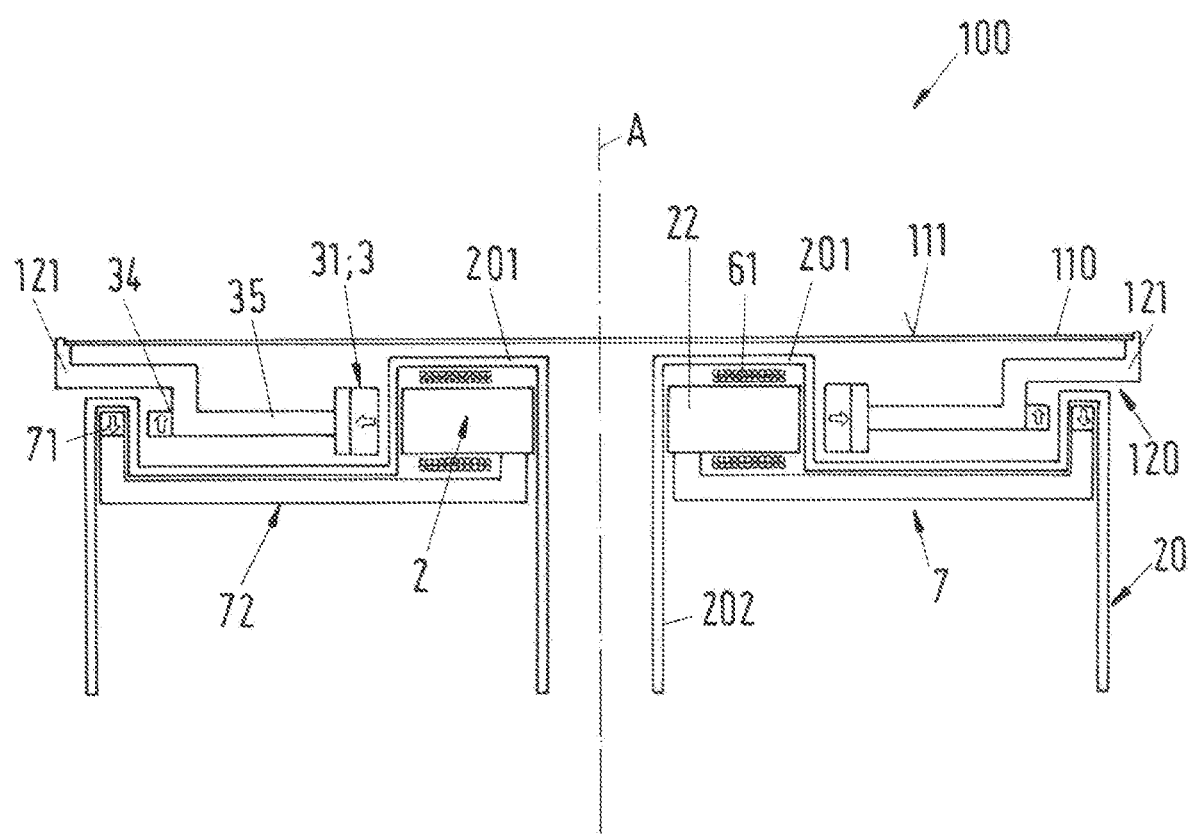
FIG. 24 is a schematic section in axial direction through the embodiment from FIG. 22.

In the embodiment represented in FIG. 22-FIG. 24, the rotational device 100 comprises the electromagnetic rotary drive 1 being designed according to the first embodiment (FIG. 3) here. In addition, a process chamber 20 is provided, of which only those areas of the process chamber wall are shown in FIG. 22-FIG. 27, which separate the stator 2 from the rotor 3. It is understood that the entire process chamber 20 is designed in such a way that the rotor 3 with the wafer 110 is arranged completely inside the lockable process chamber 20. The stator 2 and the additional bearing stator 7 are arranged outside the process chamber 20. As can best be seen in FIG. 23 and FIG. 24, the process chamber 20 is designed such that, on the one hand, it extends between the rotor 3 and, on the other hand, the stator 2 and the additional bearing stator 7, i.e. the stator 2 and the additional bearing stator 7 are arranged outside the process chamber 20, while the rotor 3 with the wafer 110 is arranged inside the process chamber 20. For this purpose, the process chamber 20 comprises a wall part 201 (FIG. 24) and a centrally arranged hollow cylindrical part 202, which is arranged within the ring-shaped reflux 22 of the stator 2. From the hollow cylindrical part 202, the wall part 201 extends radially outwards, first running above the coils 61 of stator 2, then below the rotor 3 along the magnetically effective core 31, the connecting element 35 and the bearing ring 34, and then above the stator ring 71 of the additional bearing stator 7.

This design has the advantage that the stator 2 and the additional bearing stator 7 can be arranged outside the process chamber 20, in which the wafer 110 is treated, while the rotor 3 with the wafer 110 can be arranged inside the process chamber 20. In this respect, the hollow cylindrical part 202 of the process chamber 20 provides an access to the process chamber 20, through which fluids can be discharged from the process chamber 20 or introduced into the process chamber 20, for example. Furthermore, the hollow cylindrical part 202 can be generally used as access to the process chamber 20, for example for electrical supply or signal lines connected to heaters or plasma sources or radiation sources or sensors, etc. The hollow cylindrical part 202 can also be used for the supply and discharge of a coolant into or from the process chamber 20.

The rotor 3 comprises a holder 120 to hold or fix the wafer 110 on the rotor 3. The holder 120 comprises a plurality of supporting arms 121, which are distributed equidistantly over the rotor 3, seen from the circumferential direction. In the embodiment described here, eight essentially identical supporting arms 121 are provided. Each supporting arm 121 is arranged on the connecting element 35 of the rotor 3 and fixed to the connecting element 35 so that each supporting arm 121 is connected to the connecting element 35 in a torque-proof manner and thus also connected to the rotor 3 in a torque-proof manner. It is also possible that all supporting arms 121 are an integral part of the connecting element 35, i.e. that the connecting element 35 is designed in one piece with all supporting arms 121.

Each supporting arm 121 extends radially outwards from the connecting element 35 and above the bearing ring 34 of the rotor 3 in each case. The radially externally disposed end of each supporting arm 121 is designed to receive the wafer 110. For this purpose, the radially externally disposed end of each supporting arm 121 may each have a stop or recess or a differently configured holding mechanism for the wafer 110, such that the wafer 110 can be held on the rotor 3 or fixed on the rotor 3 by the totality of the supporting arms 121. The radially externally disposed ends of the supporting arms 121 lie on a circle whose diameter corresponds to the diameter DK of the wafer 110.

To treat the wafer 110 or its surface 111, the wafer 110 is inserted into the holder 120 and is then rotated by the rotor 3.

The embodiment of the rotational device 100 represented in FIG. 22-FIG. 24 is particularly suitable for the treatment of large wafers 110 whose diameter DK is larger than the outer diameter of the stator ring 71 or the bearing ring 34.

Figure 25:
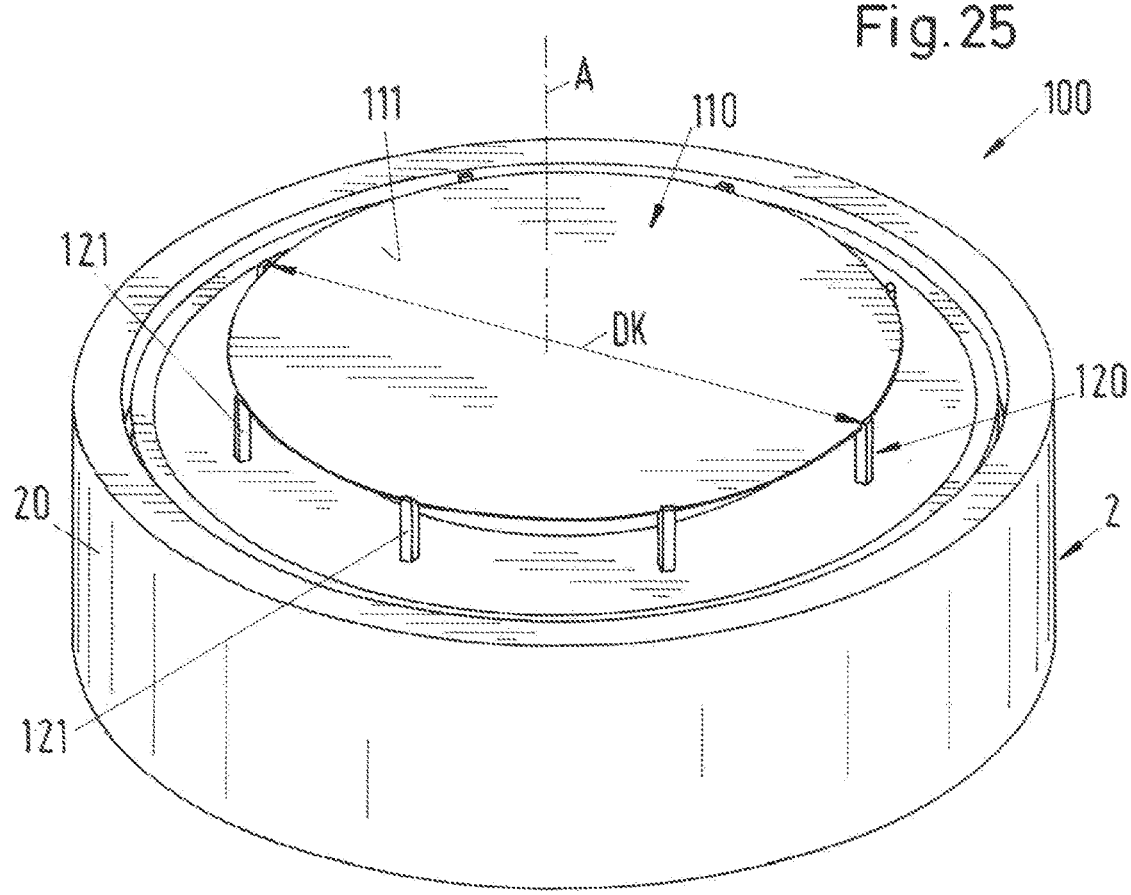
FIG. 25 is a perspective representation of a variant of the embodiment from FIG. 22.
Figure 26:
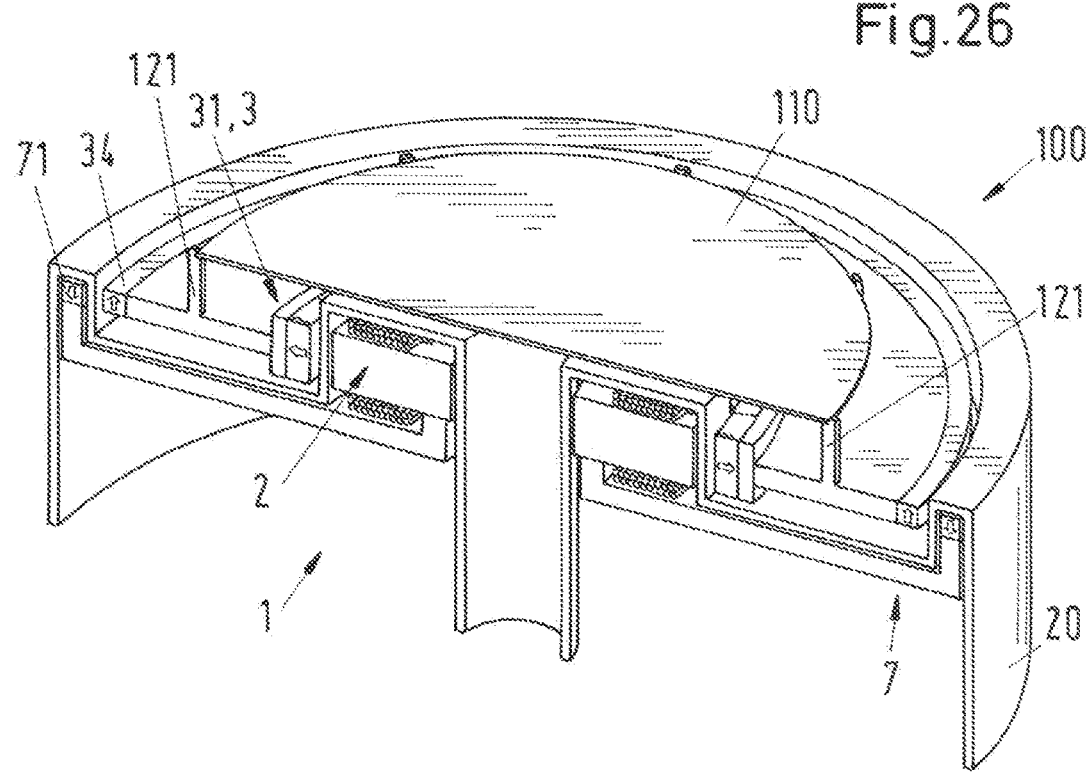
FIG. 26 is a perspective sectional representation of the variant from FIG. 24.
Figure 27:
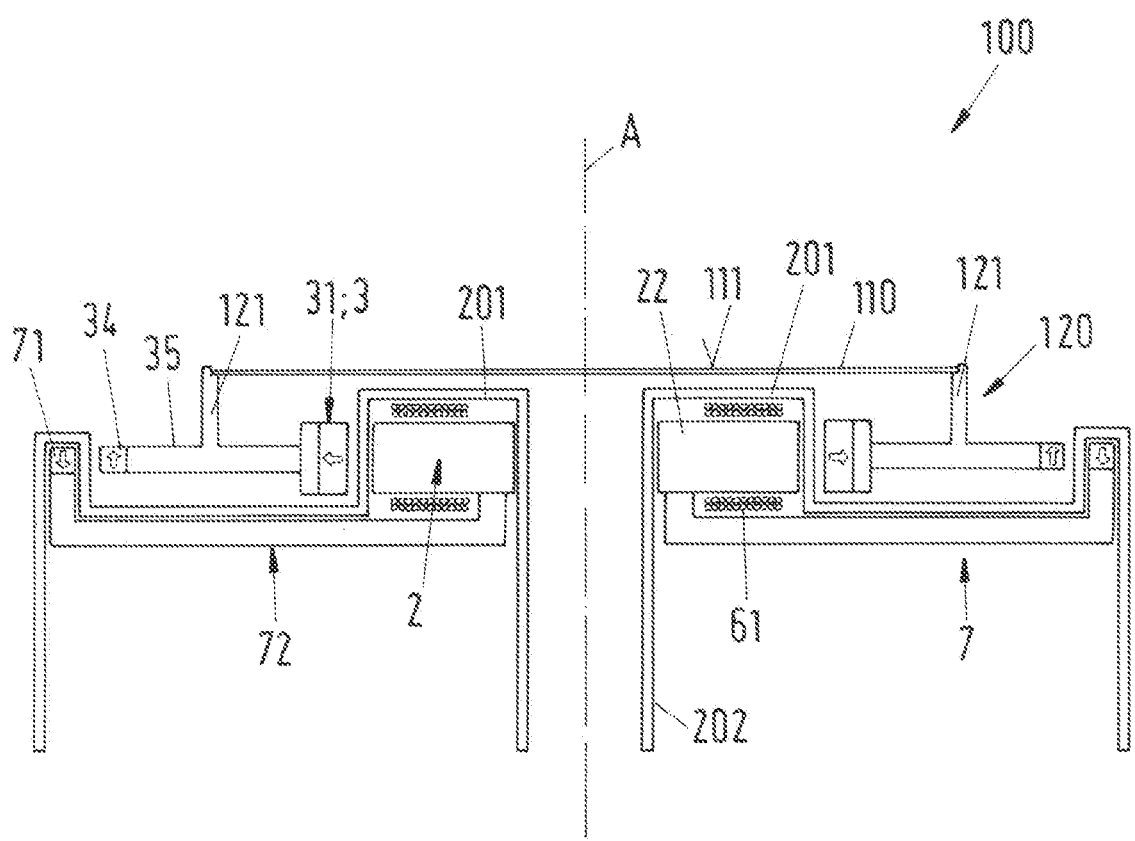
FIG. 27 is a schematic section in axial direction through the variant from FIG. 25.

FIG. 25 shows a perspective representation of a variant of the embodiment of a rotational device 100 according to the invention for treating the surface 111 of the disk-shaped body represented in FIG. 22-FIG. 24. For a better understanding, FIG. 26 still shows a perspective sectional representation of this variant in a section in axial direction A and FIG. 27 shows a schematic sectional representation of this variant in a section along the axial direction A.

The variant of the rotational device 100 differs in the design of the holder 120 for the wafer 110. This variant is designed for smaller wafers 110, whose outer diameter DK is smaller than the inner diameter of the bearing ring 34. The supporting arms 121 arranged equidistantly on the connecting element, seen in the circumferential direction, are each designed here as a bar-shaped supporting arm 121 extending in the axial direction A.

It is understood that the rotational device 100 according to the invention for treating the surface 111 of the disk-shaped body 110 may also be designed with an electromagnetic rotary drive 1 being designed according to the second embodiment (FIG. 7), in which the stator ring 71 is thus arranged spaced from the bearing ring 34 with respect to the axial direction A, in particular below the bearing ring 34.

Furthermore, a rotational device for conveying, mixing or stirring fluids is proposed by the invention, which is characterized in that the rotational device comprises an electromagnetic rotary drive 1 which is designed according to the invention, wherein the rotor 3 of the rotary drive 1 is designed as the rotor 3 of the rotational device.

FIG. 28 shows in a perspective representation an embodiment of a rotational device according to the invention, which is designed as a mixing device. The mixing device is referred to as a whole with the reference sign 200. For a better understanding, FIG. 29 still shows a perspective sectional representation of the mixing device 200 in a section in axial direction A and FIG. 30 shows a schematic sectional representation of the mixing device 200 in a section along the axial direction A.

In the embodiment represented in FIG. 28-FIG. 30, the mixing device 200 comprises the electromagnetic rotary drive 1 being designed here according to the second embodiment (FIG. 7), in which the stator ring 71 is arranged spaced from the bearing ring 34 with respect to the axial direction A. The stator ring 71 is arranged as represented (FIG. 29, FIG. 30) below the bearing ring 34 in such a way that the stator ring 71 and the bearing ring 34 are in alignment with each other with respect to the axial direction A.

The rotor 3 comprises a plurality of vanes 210 for mixing or stirring fluids. In the embodiment described here, a total of four vanes 210 are provided, whereby this number has exemplary character. All vanes 210 are arranged on the connecting element 35 and equidistantly arranged with respect to the circumferential direction of the rotor 3. Each vane 210 extends outwards in radial direction and is connected to the connecting element 35 in a torque-proof manner and thus also connected to the rotor 3 in a torque-proof manner. The vanes 210 may be separate components, which are then fixed to the connecting element 35. Of course, it is also possible that all vanes 210 are an integral part of the connecting element 35, i.e. that the connecting element 35 is designed in one piece with all vanes 210. The rotor 3 with the vanes 210 forms the impeller wheel or the impeller of the mixing device 200, which acts on the fluid or fluids.

It is an advantageous aspect that the rotor 3 is designed as an integral rotor, because it is both the rotor 3 of the electromagnetic rotary drive 1 and the rotor 3 of the mixing device 200, with which fluids can be conveyed, mixed or stirred. In total, the rotor 3 thus fulfills three functions in one: it is the rotor of the electromagnetic drive, it is the rotor of the magnetic levitation and it is the impeller, which acts on the fluid(s). This design as an integral rotor offers the advantage of a very compact and space-saving design.

The mixing device 200 further comprises a mixing tank 220 having a dimensionally stable bottom 221. In FIG. 28 and FIG. 29, only the bottom 221 of the mixing tank 220 is represented. The mixing tank 220 serves to receive the fluid or fluids to be mixed or stirred. In addition to the dimensionally stable bottom 221, the mixing tank 220 comprises at least a further wall 223 (FIG. 30), which limits the mixing tank 220. This wall 223 is not represented in FIG. 28 and FIG. 29 and indicated in FIG. 30. In this respect, the wall 223 may be designed as a dimensionally stable wall, which includes a plastic, for example. However, the wall 223 can also be designed as a flexible wall 223 and preferably made of a plastic. The flexible wall 223, together with the dimensionally stable bottom 221, then forms the mixing tank 220 for receiving the substances to be mixed or stirred, wherein this mixing tank 220 is then designed as a flexible bag, for example a plastic bag or a synthetic bag, which can be folded so that it takes up as little space as possible during storage. This design of the mixing tank 220 is particularly suitable for single-use applications in which the mixing tank 220 with the rotor 3 arranged in it is only used once as intended and is replaced by a new mixing tank for another application.

It is understood that the mixing device 200 or the mixing tank 220 can also be designed for multiple applications, i.e. for multiple use. For multiple applications, it is preferred if the entire mixing tank 220 is designed dimensionally stable. Preferably, the mixing tank 220 is then made of a stainless steel, but can also be made of a plastic, glass or another material.

The dimensionally stable bottom 221 of the mixing tank 220 comprises a containment can 222 to receive the stator 2 of the rotary drive 1. The containment can 222 is centrally located in the bottom 221 and within the ring-shaped magnetically effective core 31 of the rotor 3 so that the magnetically effective core 31 of the rotor 3 surrounds the containment can 222 in the operating state. For this purpose, the containment can 222 is dimensioned such a that the magnetically effective core 31 of the rotor 3 or a jacket not shown encloses the containment can 222 with as little clearance as possible.

As shown in particular in FIG. 29 and FIG. 30, the dimensionally stable bottom 221 with the containment can 222 in the mixing device 200 is designed and arranged such that the containment can 222 is arranged between the stator poles 21 of the stator 2 and the magnetically effective core 31 of the rotor 3 and that the dimensionally stable bottom 221 extends in radial direction between the magnetically effective core 31, the connecting element 35 and the bearing ring 34 of the rotor 3 on the one hand, and the supporting body 72 and the stator ring 71 of the additional bearing stator 7 on the other hand. In the assembled state, the stator 2 and the additional bearing stator 7 are thus arranged outside the mixing tank 220, while the rotor 3 with the vanes 210 is arranged inside the mixing tank 220.

This design of the mixing device 200 is also particularly suitable for embodiments comprising components for single use. The mixing device preferably has a single-use device designed for single use and a reusable device designed for multiple use.

The term "single-use device" and other compositions with the component "single-use" refer to those components or parts which are designed for single use, i.e. which can only be used once as intended and are then disposed of. For a new application, a new, previously unused single-use part must then be used. When configuring or designing the single-use device, it is therefore an essential aspect that the single-use device can be combined as easily as possible with the reusable device to form the mixing device 200. The single-use device should therefore be able to be replaced very easily without the need for high assembly costs. Particularly preferably, the single-use device should be able to be assembled with and separated from the reusable device without the use of tools.

In the mixing device 200, the single-use device comprises the mixing tank 220 with the rotor 3 inside, and the reusable device comprises the stator 2 and the additional bearing stator 7.

With regard to the simplest possible design and a simplest possible assembly or separation of the single-use device and the reusable device, it is advantageous that the rotary drive 1 is designed according to the second embodiment (FIG. 7), in which the stator ring 71 is arranged spaced from the bearing ring 34 with respect to the axial direction A. In doing so, the mixing tank 220 can be assembled with and separated from the stator 2 and the additional bearing stator 7 in a very simple manner. To assemble, it is only necessary to place the containment can 222 over the stator 2 and the mixing device 200 is ready for use. After use, the mixing tank 210 can be easily separated again from the stator 2 and the additional bearing stator 7.

It is understood that the whole mixing device 200 can also be designed as a reusable device, i.e. for multiple use. With such a design, the mixing tank 220 in particular, with the rotor 3 arranged in it, is also designed for multiple use.

The rotational device designed as mixing device 200 can be used in particular in the pharmaceutical industry and in the biotechnological industry. The mixing device 200 is particularly suitable for such applications where a very high degree of purity or sterility of the components coming into contact with the substances to be mixed is essential. The mixing device 200 can also be designed as a bioreactor or fermenter. However, it is understood that the mixing device 200 is not limited to such designs but can generally be designed as a mixing device 200 with which media or substances can be mixed or stirred. In particular, these substances may be fluids or solids, preferably powders. The mixing device 200 is suitable for mixing liquids with each other and/or for mixing at least one liquid with a powder or other solid and/or for mixing gases with liquids and/or solids.

It is understood that the rotational device 200 for conveying, mixing or stirring fluids according to the invention can also be designed with an electromagnetic rotary drive 1, which is designed according to the first embodiment (FIG. 3), in which the stator ring 71 is arranged concentrically with the bearing ring 34, so that the stator ring 71 surrounds the bearing ring 34.

What is claimed:

1. An electromagnetic rotary drive, which is designed as an external rotor, having a rotor comprising:
    a ring-shaped magnetically effective core arranged around a stator and having a magnetic central plane, the stator being a bearing and a drive stator with drive coils, with which, in an operating state, the rotor being contactlessly magnetically drivable about an axis of rotation defining an axial direction, and with which the rotor is contactlessly magnetically levitatable with respect to the stator, the rotor actively magnetically levitated in a radial plane perpendicular to the axial direction, and passively magnetically stabilized in the axial direction and against tilting, the rotor comprising a magnetically effective bearing ring arranged radially externally disposed and spaced from the magnetically effective core of the rotor, and a bearing stator having a magnetically effective stator ring configured to interact with the bearing ring, the bearing stator configured and arranged such that the stator ring passively magnetically stabilizes the rotor against tilting with the drive coils disposed radially inwardly of both the magnetically effective core and the magnetically effective stator ring, and the bearing ring is connected to the magnetically effective core of the rotor via a connecting element made of a material configured to decouple the bearing ring and the magnetically effective core.

2. The rotary drive according to claim 1, wherein the bearing ring of the rotor and the stator ring of the bearing stator each comprise at least one permanent magnet.

3. The rotary drive according to claim 1, wherein the bearing ring of the rotor is arranged in the magnetic central plane of the magnetically effective core of the rotor.

4. The rotary drive according to claim 1, wherein the bearing ring is arranged with respect to the axial direction at a distance different from zero to the magnetic central plane of the magnetically effective core of the rotor, and the distance is at most one quarter of the inner radius of the bearing ring.

5. The rotary drive according to claim 1, wherein the stator ring of the bearing stator is arranged concentrically with the bearing ring of the rotor such that the stator ring surrounds the bearing ring radially externally disposed.

6. The rotary drive according to claim 1, wherein the stator ring of the bearing stator is arranged spaced from the bearing ring of the rotor with respect to the axial direction, and the stator ring has a same inner radius as the bearing ring.

7. The rotary drive according to claim 1, wherein the connecting element is disk-shaped.

8. The rotary drive according to claim 1, wherein the connecting element comprises a plurality of spokes, each extending in a radial direction between the magnetically effective core of the rotor and the magnetically effective bearing ring of the rotor.

9. The rotary drive according to claim 1, wherein the stator ring and the bearing ring each include a permanent magnetic material and are each segmented with a plurality of permanent magnets.

10. The rotary drive according to claim 2, wherein the stator ring and the bearing ring each are magnetized in the axial direction, and a magnetization of the stator ring are directed in an opposite direction to a magnetization of the bearing ring.

11. The rotary drive according to claim 2, wherein the stator ring and the bearing ring each are magnetized in a radial direction, a magnetization of the stator ring and a magnetization of the bearing ring being directed in a same direction.

12. The rotary drive according to claim 2, wherein the stator ring is magnetized in the axial direction or the bearing ring is magnetized in a radial direction, or the stator ring is magnetized in a radial direction and the bearing ring is magnetized in the axial direction.

13. A rotational device for treating a surface of a disk-shaped body with which the body is rotatable for treatment, the rotational device comprising the electromagnetic rotary drive according to claim 1, the rotor comprising a holder for the disk-shaped body.

14. A rotational device for conveying, mixing or stirring fluids, the rotational device comprising the electromagnetic rotary drive according to claim 1, the rotor of the rotary drive being rotor of the rotational device.

15. The rotational device according to claim 14, wherein the rotor has a plurality of vanes configured to mix or stir fluids, the vanes being arranged on the connecting element.

16. The rotary drive according to claim 4, wherein the distance is at most one fifth of the inner radius of the bearing ring.

17. The rotary drive according to claim 1, wherein the connecting element is disk-shaped and has a plurality of recesses.

18. The rotary drive according to claim 11, wherein the magnetization of the stator ring and the magnetization of the bearing ring each are directed radially outwards.

19. The rotary drive according to claim 1, wherein the rotor is disposed entirely externally to the drive coils of the stator.

* * * * *